(12) United States Patent
Choi et al.

(10) Patent No.: US 10,235,791 B2
(45) Date of Patent: Mar. 19, 2019

(54) DIGITAL DEVICE AND SERVICE PROCESSING METHOD THEREOF

(71) Applicant: LG ELECTRONICS INC., Seoul (KR)

(72) Inventors: Soongil Choi, Seoul (KR); Kunmyon Choi, Seoul (KR); Gray Norton, Santa Clara, CA (US)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 15/121,505

(22) PCT Filed: Feb. 4, 2015

(86) PCT No.: PCT/KR2015/001154
§ 371 (c)(1),
(2) Date: Aug. 25, 2016

(87) PCT Pub. No.: WO2015/130026
PCT Pub. Date: Sep. 3, 2015

(65) Prior Publication Data

US 2016/0364897 A1    Dec. 15, 2016

Related U.S. Application Data

(60) Provisional application No. 61/945,792, filed on Feb. 27, 2014.

(30) Foreign Application Priority Data

Oct. 17, 2014  (KR) .................. 10-2014-0140822

(51) Int. Cl.
*G06F 3/048*      (2013.01)
*G06T 13/80*      (2011.01)
(Continued)

(52) U.S. Cl.
CPC ............ *G06T 13/80* (2013.01); *G06F 3/0481* (2013.01); *G06F 3/04847* (2013.01);
(Continued)

(58) Field of Classification Search
None
See application file for complete search history.

(56) References Cited

U.S. PATENT DOCUMENTS 6,141,018 A * 10/2000 Beri .................. G06F 17/212
                                                345/473
6,377,925 B1 * 4/2002 Greene, Jr. .......... G10L 21/06
                                                379/52

(Continued)

FOREIGN PATENT DOCUMENTS

JP    2007-316613    12/2007
JP    5354316         9/2013
(Continued)

OTHER PUBLICATIONS

International Search Report and Written Opinion dated Apr. 28, 2015 issued in Application No. PCT/KR2015/001154 (with English translation).

*Primary Examiner* — Hua Lu
(74) *Attorney, Agent, or Firm* — KED & Associates, LLP

(57) ABSTRACT

Disclosed in the present specification are a digital device and a service processing method thereof. The digital device and the service processing method thereof according to the present invention may comprise the steps of: receiving text data; activating a text field for displaying the received text data; displaying the text data within the activated text field; checking whether or not the attribute type of the text field is a marquee attribute; and as a result of checking, if the
(Continued)

attribute type of the text field is a marquee attribute, moving the text displayed within the text field in a predetermined direction.

18 Claims, 25 Drawing Sheets

(51) Int. Cl.
| | |
|---|---|
| *G10L 15/22* | (2006.01) |
| *G10L 15/26* | (2006.01) |
| *G10L 15/28* | (2013.01) |
| *G06F 17/24* | (2006.01) |
| *G06F 21/62* | (2013.01) |
| *G06F 3/0481* | (2013.01) |
| *G06F 3/0484* | (2013.01) |
| *G06F 21/83* | (2013.01) |
| *H04N 21/422* | (2011.01) |
| *H04N 21/4402* | (2011.01) |
| *H04N 21/488* | (2011.01) |
| *H04N 21/81* | (2011.01) |

(52) U.S. Cl.
CPC ........ *G06F 17/243* (2013.01); *G06F 21/6281* (2013.01); *G06F 21/83* (2013.01); *G10L 15/22* (2013.01); *G10L 15/26* (2013.01); *G10L 15/28* (2013.01); *H04N 21/42203* (2013.01); *H04N 21/440236* (2013.01); *G06F 2221/031* (2013.01); *H04N 21/4886* (2013.01); *H04N 21/8126* (2013.01)

(56) References Cited

U.S. PATENT DOCUMENTS

| | | | | |
|---|---|---|---|---|
| 7,770,122 | B1* | 8/2010 | Shaik | G06F 17/3089 709/201 |
| 8,942,921 | B1* | 1/2015 | Unnikrishnan | G06F 3/147 345/634 |
| 2004/0179822 | A1* | 9/2004 | Tsumagari | G11B 27/105 386/240 |
| 2005/0069280 | A1* | 3/2005 | Chen | H04N 5/85 386/336 |
| 2006/0149960 | A1* | 7/2006 | Paul | G06F 1/206 713/100 |
| 2006/0271434 | A1* | 11/2006 | Ruttenberg | G06Q 30/02 705/14.61 |
| 2006/0288327 | A1* | 12/2006 | Torgerson | G06F 8/34 717/105 |
| 2008/0276194 | A1* | 11/2008 | Dykstra-Erickson | G06F 17/243 715/780 |
| 2010/0007792 | A1* | 1/2010 | Kim | H04N 5/44513 348/569 |
| 2010/0118035 | A1* | 5/2010 | Yamakami | G06F 17/30781 345/473 |
| 2011/0037833 | A1* | 2/2011 | Lee | H04N 13/183 348/46 |
| 2011/0225492 | A1* | 9/2011 | Boettcher | G06F 3/0485 715/702 |
| 2011/0231793 | A1* | 9/2011 | Wilson | G06F 3/04845 715/810 |
| 2011/0270824 | A1* | 11/2011 | Morris | G06F 3/04883 707/722 |
| 2012/0133748 | A1* | 5/2012 | Chung | H04N 13/0011 348/51 |
| 2013/0198720 | A1* | 8/2013 | Maurice | G06F 8/64 717/122 |
| 2013/0302014 | A1* | 11/2013 | Uchimura | H04N 5/278 386/244 |
| 2014/0185093 | A1* | 7/2014 | Takasu | G06F 3/1209 358/1.15 |
| 2014/0189558 | A1* | 7/2014 | Takami | G06F 3/0481 715/767 |
| 2014/0215393 | A1* | 7/2014 | Schwartz | G06F 3/0482 715/810 |
| 2015/0149540 | A1* | 5/2015 | Barker | H04L 12/1827 709/204 |
| 2015/0186012 | A1* | 7/2015 | Coleman | G06F 3/04842 715/752 |

FOREIGN PATENT DOCUMENTS

| | | |
|---|---|---|
| JP | 2013-240072 | 11/2013 |
| KR | 10-2010-0006845 | 1/2010 |
| KR | 10-2011-0018262 | 2/2011 |
| KR | 10-2011-0123417 | 11/2011 |

* cited by examiner

DIGITAL DEVICE AND SERVICE PROCESSING METHOD THEREOF

CROSS-REFERENCE TO RELATED PATENT APPLICATIONS

This application is a U.S. National Stage Application under 35 U.S.C. § 371 of PCT Application No. PCT/KR2015/001154, filed Feb. 4, 2015, which claims priority to U.S. Provisional Application No. 61/945,792, filed Feb. 27, 2014 and Korean Patent Application No. 10-2014-0140822, filed Oct. 17, 2014, whose entire disclosures are hereby incorporated by reference.

TECHNICAL FIELD

The present invention relates to a digital device and, more particularly, to a digital device capable of performing a marquee function and service processing method thereof.

BACKGROUND ART

Subsequent to stationary devices such as a personal computer (PC) or a television (TV), mobile devices such as a smartphone or a tablet PC have been remarkably developed.

Although stationary devices and mobile devices have been independently developed in respective areas, recently, the areas of the stationary devices and the mobile devices are becoming ambiguous according to a boom in digital convergence.

In addition, with development and environmental changes of such digital device development, requirements of users have been also gradually increased and diversified and thus requests to support various high-end services or applications have been increased.

DISCLOSURE OF THE INVENTION

Technical Task

Accordingly, embodiments of the present invention are directed to a digital device and service processing method thereof that substantially obviate one or more problems due to limitations and disadvantages of the related art. An object of the present invention devised to solve the problem lies in supporting and processing a marquee service in a web OS platform loaded digital device.

Another object of the present invention devised to solve the problem lies in giving a marquee animation effect of moving a text displayed within a text filed according to a presence or non-presence of a marquee attribute of an activated field, thereby providing user's convenience.

A further object of the present invention devised to solve the problem lies in giving a marquee animation effect to a text of high importance and urgency by switching an attribute type of a text field to a marquee attribute according to a presence or non-presence of a marquee attribute of a received text data, thereby providing user's interest and alarm service.

A further object of the present invention devised to solve the problem lies in giving a marquee animation effect to a text of high importance and urgency by switching an attribute type of a text field to a marquee attribute according to a priority of an attribute of the text data, thereby providing user's interest and alarm service.

A further object of the present invention devised to solve the problem lies in extracting a setup value for a marquee attribute of a text field and giving a marquee animation effect of moving a text displayed within the text field in a preset direction according to the extracted setup value, thereby providing a user with various visual effects.

A further object of the present invention devised to solve the problem lies in providing an editing service of changing a setup value for a marquee attribute in response to a request for changing the setup value for the marquee attribute.

The technical problems solved by the present invention are not limited to the above technical problems and other technical problems which are not described herein will become apparent to those skilled in the art from the following description.

Technical Solutions

This description discloses various embodiments of the digital device and service processing method thereof.

The object of the present invention can be achieved by providing a method of processing a service in a digital device includes receiving text data, activating a text field desired to have the received text data displayed thereon, displaying the text data within the activated text field, checking whether an attribute type of the text field is a marquee attribute, and if the attribute type of the text field is the marquee attribute as a result of the checking, moving a text displayed within the text field in a preset direction.

In another aspect of the present invention, provided herein a digital device includes a communication module receiving text data, a display module displaying the received text data within a text field, and a controller configured to control an operation of the digital device, the controller is further configured to activate the text field desired to have the received text data displayed thereon, check whether an attribute type of the text field is a marquee attribute, and if the attribute type of the text field is the marquee attribute as a result of the checking, move a text displayed within the text field in a preset direction.

The technical solution which can be obtained by the present invention are not limited to the above-described technical solution, and other technical solutions which are not described herein will be understood by one of ordinary skill in the art based on the detailed description of the present invention.

Advantageous Effects

According to one of various embodiments of the present invention, the present invention can support and process a marquee service in a web OS platform loaded digital device.

According to one of various embodiments of the present invention, the present invention gives a marquee animation effect of moving a text displayed within a text filed according to a presence or non-presence of a marquee attribute of an activated field, thereby providing user's convenience.

According to one of various embodiments of the present invention, the present invention gives a marquee animation effect to a text of high importance and urgency by switching an attribute type of a text field to a marquee attribute according to a presence or non-presence of a marquee attribute of a received text data, thereby providing user's interest and alarm service.

According to one of various embodiments of the present invention, the present invention extracts a setup value for a marquee attribute of a text field and gives a marquee animation effect of moving a text displayed within the text field in a preset direction according to the extracted setup value, thereby providing a user with various visual effects.

According to one of various embodiments of the present invention, the present invention provides an editing service of changing a setup value for a marquee attribute in response to a request for changing the setup value for the marquee attribute.

Effects obtainable from the present invention may be non-limited by the above mentioned effect. And, other unmentioned effects can be clearly understood from the following description by those having ordinary skill in the technical field to which the present invention pertains.

BEST MODE FOR INVENTION

Figure 1:
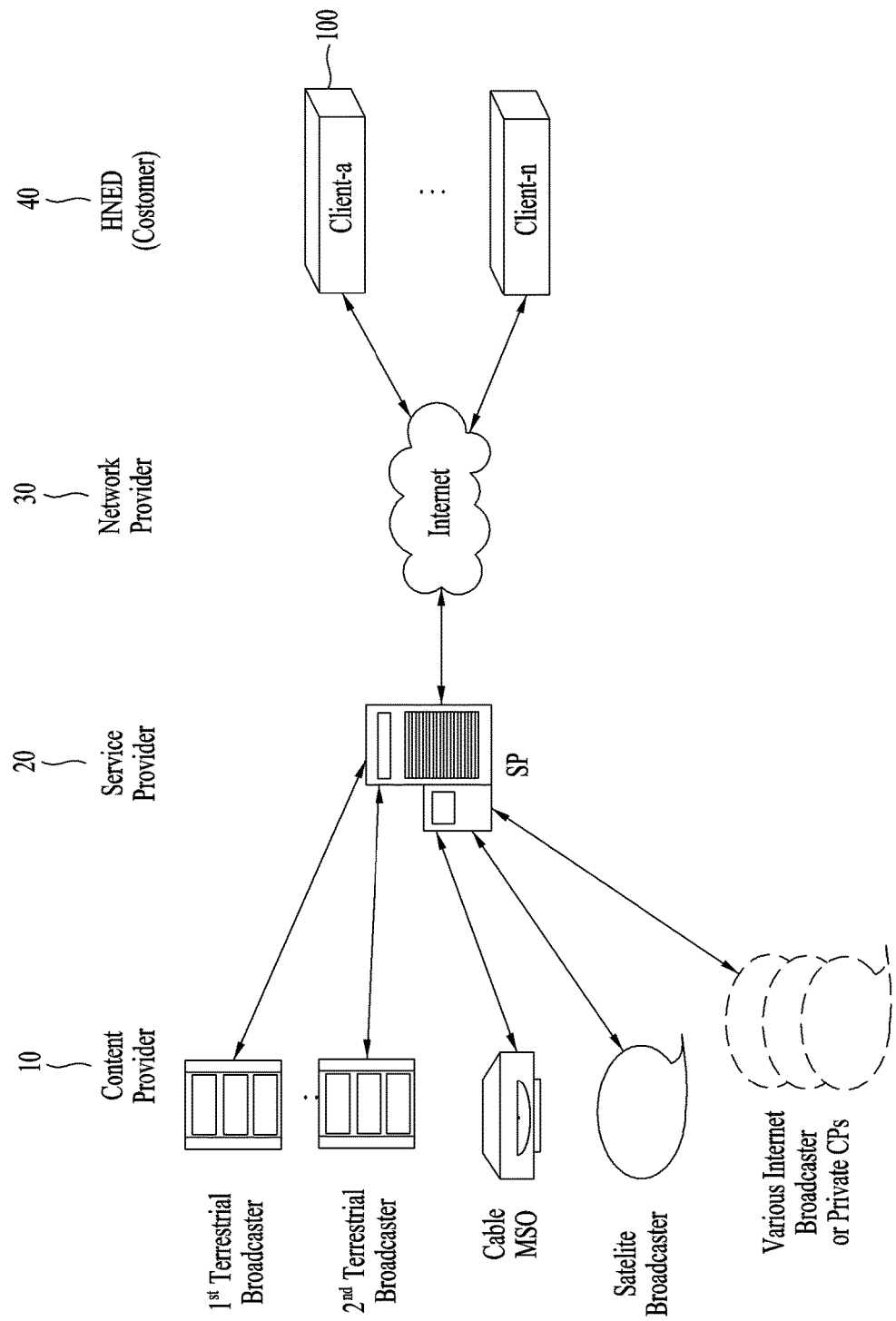
FIG. 1 is a schematic diagram illustrating a service system including a digital device according to one embodiment of the present invention.

Description will now be given in detail according to exemplary embodiments disclosed herein, with reference to the accompanying drawings.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first, 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/ LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Vide on Demand or streaming service, and service server providing pay services.

In this application, when application is described for the convenience of explanation, the meaning of application in the context can include services as well as applications.

In the following description, various embodiments according to the present invention are explained with reference to attached drawings.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

Figure 2:
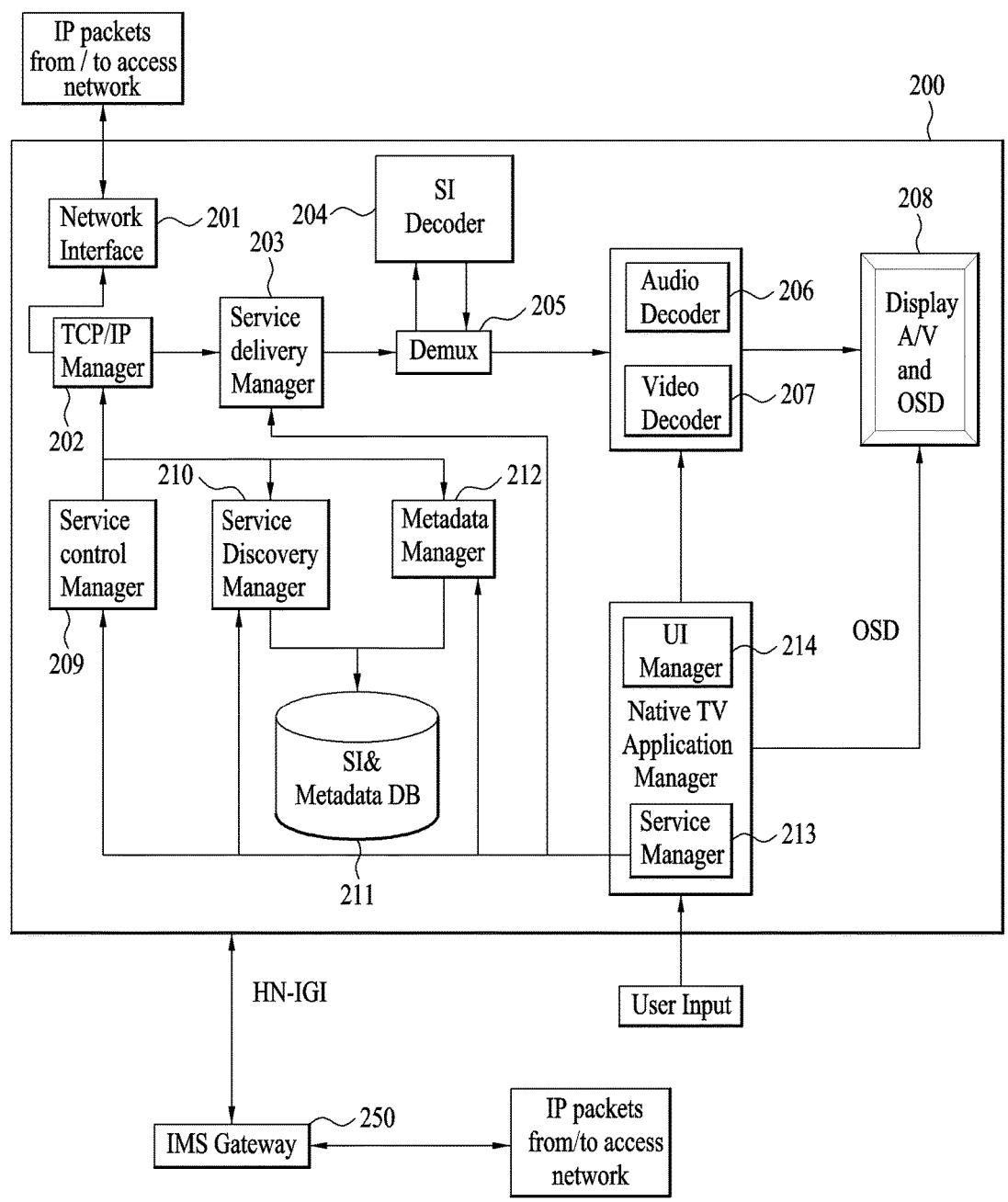
FIG. 2 is a block diagram showing a digital device according to one embodiment of the present invention.
Figure 3:
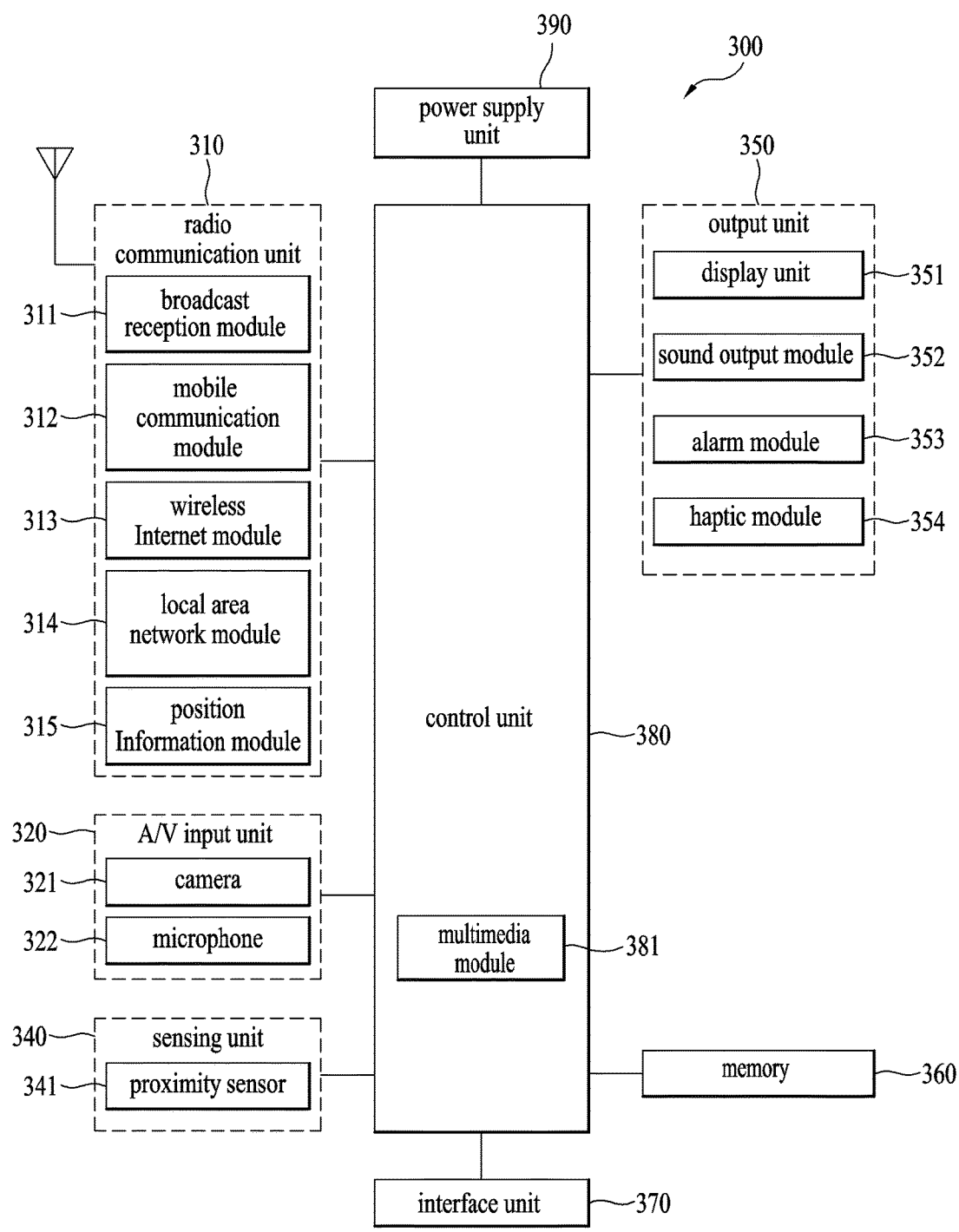
FIG. 3 is a block diagram showing the configuration of a digital device according to another embodiment of the present invention.

FIG. 2 is a schematic diagram of a digital receiver 200 according to an embodiment of the present invention.

The digital receiver 200 may correspond to the client 100 shown in FIG. 1.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc. The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map. The service manager 213 may receive service information corresponding to channel from the SI decoder 204 and set audio/video PID of a selected channel to the demultiplexer 205 so as to control the demultiplexing procedure of the demultiplexer 205.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 may include functions required to access an IMS based IPTV services.

FIG. 3 is a block diagram showing the configuration of a digital device according to another embodiment of the present invention;

FIG. 3 shows the mobile terminal 300 having various components, but it is understood that implementing all of the illustrated components is not a requirement. More or fewer components may be implemented according to various embodiments.

With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390.

The detailed description of each component is as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
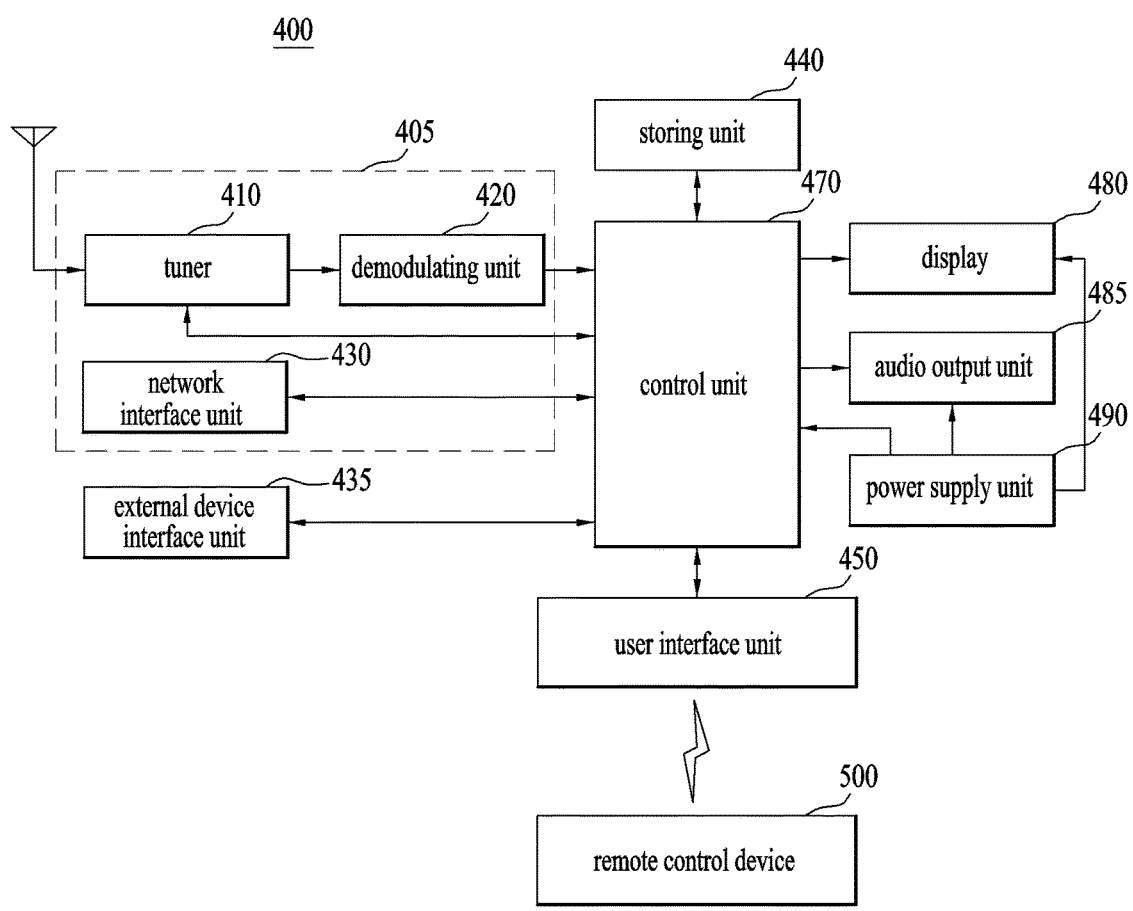
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels. Also, the tuner 410 may convert the received RF broadcast signal to an IF (Intermediate Frequency) signal or a baseband signal.

For example, if the received RF broadcast signal is a digital broadcast signal, the RF broadcast signal is converted to the IF (Intermediate Frequency) signal. Also, if the received RF broadcast signal is an analog broadcast signal, the RF broadcast signal is converted to an analog baseband video or audio signal (CVBS/SIF).

Also, the tuner 410 may receive the radio frequency (RF) broadcast signal of a single carrier or multiple carriers.

The demodulator 420 may receive a digital IF (Intermediate Frequency) signal (DIF) converted by the tuner 410 and demodulate the DIF signal.

The demodulator 420 may output a stream signal (TS) after processing demodulation and channel decoding.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 435 can be connected with a settop-box (STB) in a wired/wireless manner.

The external device interface 435 can receive applications or an application list from the adjacent external devices, and transmit to the controller 470 or the storage unit 440.

The network interface 430 may provide an interface for connecting the digital receiver 400 to wired/wireless networks.

Using the network interface 430, the digital receiver can transmit/receive data to/from other users or other electronic apparatuses through a network connected thereto or another network linked to the connected network.

Also, using the network interface 430, the digital receiver can access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital receiver 400 may further include the photographing unit (not shown) for photographing the user. Image information acquired by the photographing unit (not shown) can be supplied to the controller 470.

The controller 470 may sense a gesture of the user from an image captured by the photographing unit (not shown) or a signal sensed by the sensing unit (not shown), or by combining the image and the signal.

The power supply unit 490 may supply power to the digital receiver 400.

Particularly, the power supply unit 490 can supply power to the controller 470 which can be implemented as a system-on-chip (SoC), the display unit 480 for displaying images, and the audio output unit 485 for audio output.

Accordingly, the power supply unit 490 can include a converter converting an alternating current into a direct current.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The digital device 400 may a digital broadcast receiver for processing a digital broadcast signal of ATSC type or DVB type.

Also, in the digital device 400, some of the components may be omitted or a component may be added as required. The digital receiver according to the present invention may not include the tuner and the demodulator, differently from the digital receivers shown in FIGS. 2 and 4, and may receive content through the network interface or the external device interface and reproduce the content.

Figure 5:
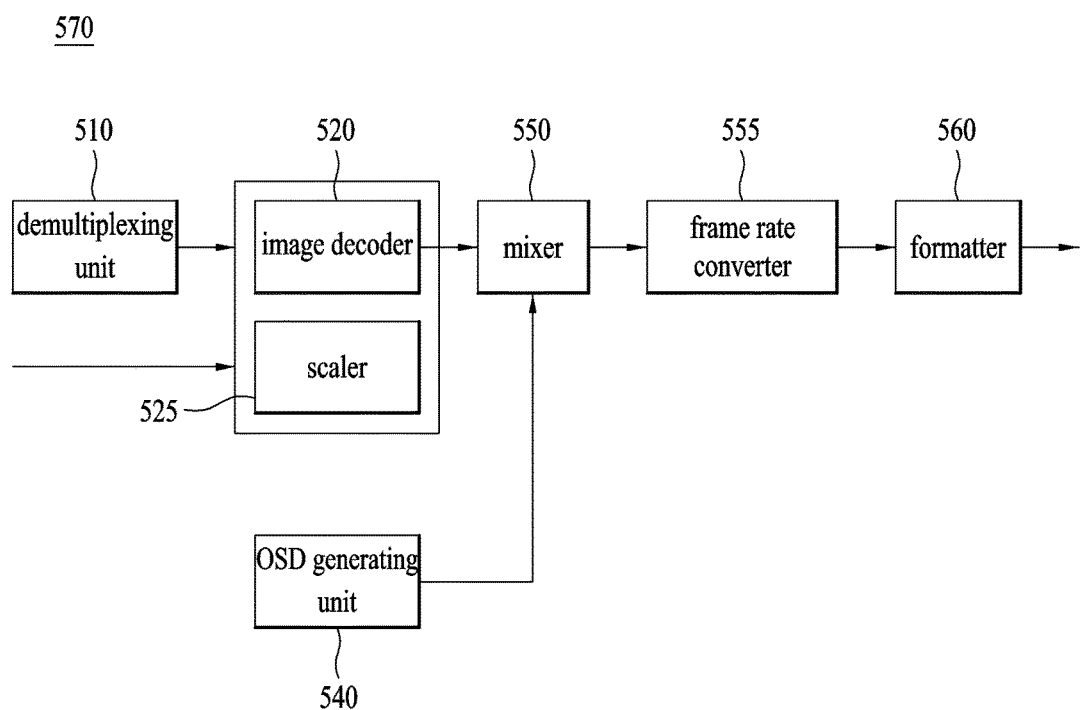
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The video decoder 525 can support various standards.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal.

Here, the encoded data signal may be EPG information including broadcast information such as the start time and end time (or duration) of a broadcast program which is broadcast through each channel.

The digital receiver is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 6:
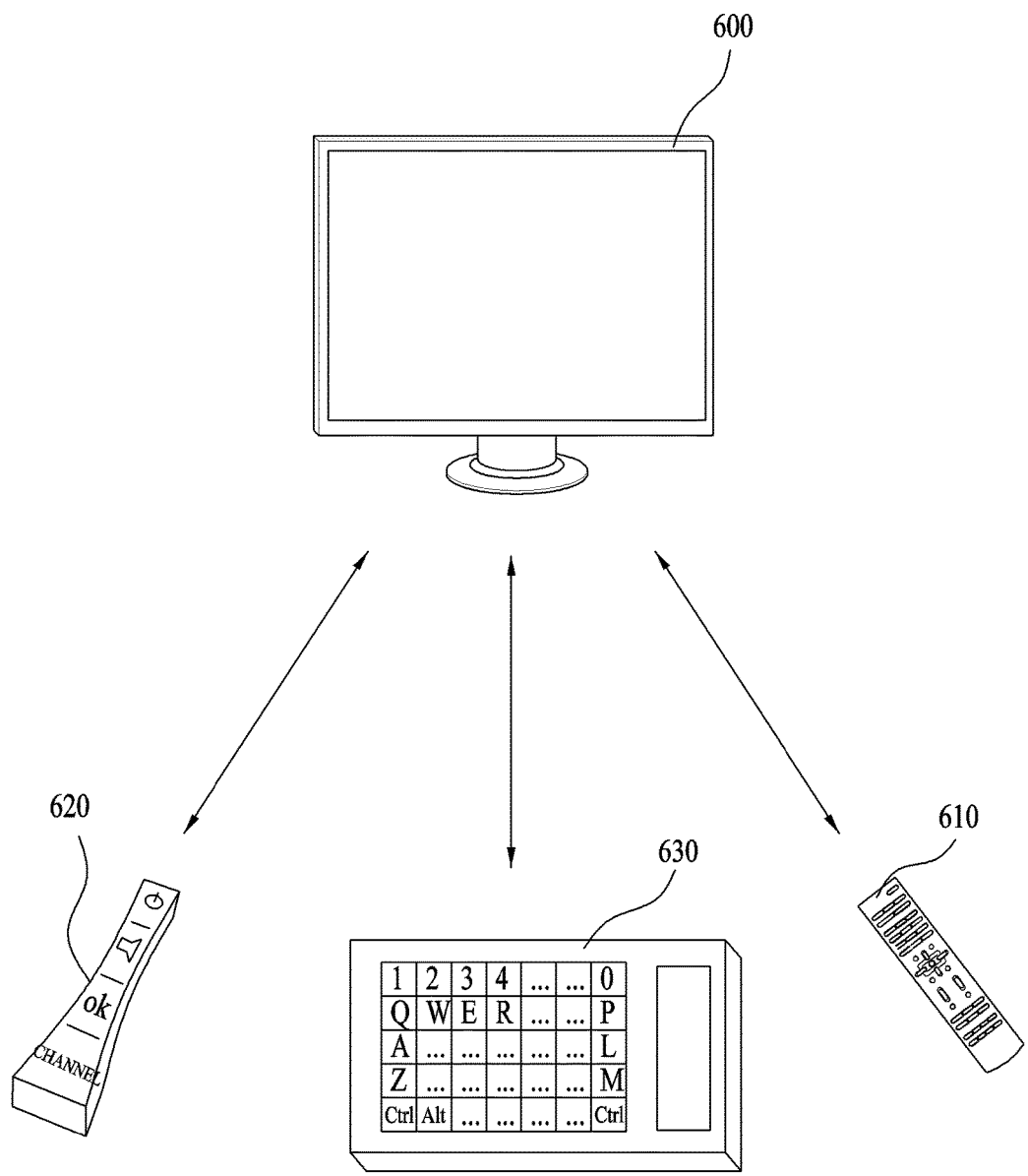
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

A front panel or a control unit (an input unit) on the digital device can use in order to control the digital device 600.

To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc.

UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

A general remote controller 610, a magic remote controller 620 and a remote controller 630 can include a touch pad. They can input a text and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 5 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking.

A WebOS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
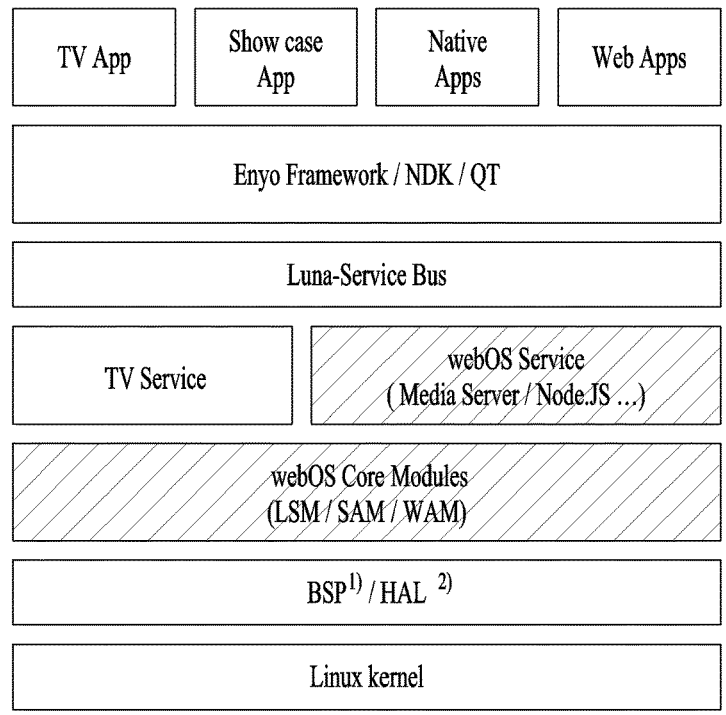
FIG. 7 is a diagram illustrating webOS architecture according to one embodiment of the present invention.

FIG. 7 is a diagram illustrating WebOS architecture according to one embodiment of the present invention.

The architecture of a WebOS platform will now be described with reference to FIG. 7.

The platform may be largely divided into a kernel, a webOS core platform based on a system library, an application, a service, etc.

The architecture of the WebOS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a WebOS core modules layer, a service layer, a Luna-service bus layer and an Enyo framework/native developer's kit (NDK)/QT layer are sequentially provided. At the highest layer, an application layer is provided.

One or more layers of the above-described WebOS layered structure may be omitted and a plurality of layers may be combined to one layer and one layer may be divided into a plurality of layers.

The WebOS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a WebOS regards a web application as a basic application.

An application may use a service via a Luna-service bus. A service may be newly registered via a bus and the application may detect and use a desired service.

The service layer may include services having various service levels, such as a TV service, a WebOS service, etc.

The WebOS service may include a media server, Node.JS, etc. and, in particular, the Node.JS service supports JavaScript, for example.

The WebOS service may be communicated to a Linux process implementing function logic via a bus. This WebOS service is largely divided into four parts, migrates from a TV process and an existing TV to a WebOS, is developed as services which differ between manufacturers, WebOS common services and Javascripts, and is composed of the Node.JS service used via Node.JS.

The application layer may include all applications supportable by a digital device, such as a TV application, a showcase application, a native application, a web application, etc.

Applications on the WebOS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the WebOS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
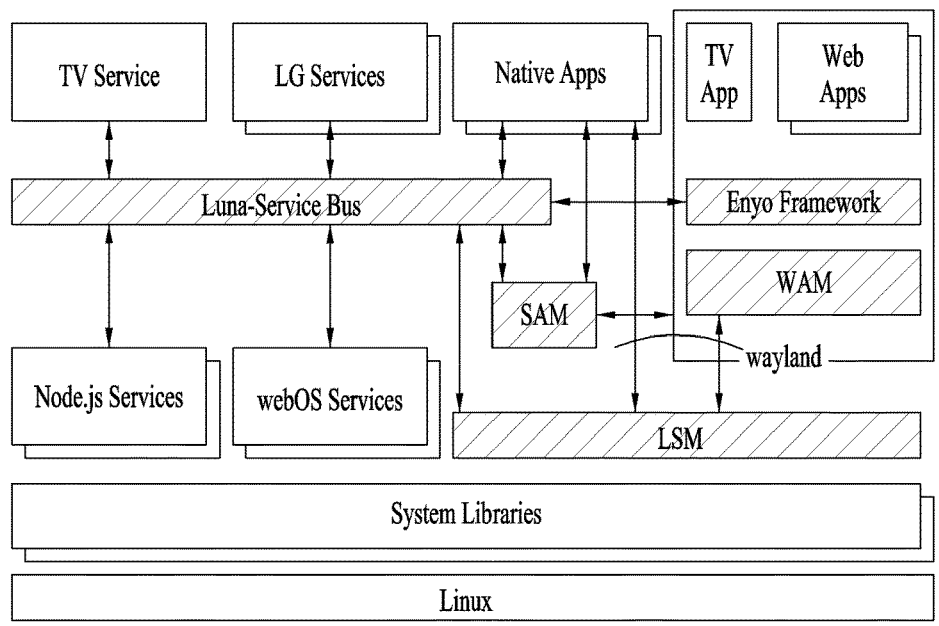
FIG. 8 is a diagram illustrating architecture of a webOS device according to one embodiment of the present invention.

FIG. 8 is a diagram illustrating the architecture of a WebOS device according to one embodiment of the present invention.

FIG. 8 is a block diagram based on a runtime of a WebOS device and is described with reference to the layered structure of FIG. 7.

Hereinafter, a description will be given with reference to FIGS. 7 and 8.

Referring to FIG. 8, services, applications and WebOS core modules are included on a system OS (Linux) and system libraries and communication therebetween may be performed via a Luna-service bus.

Node.JS services based on HTML5 such as e-mail, contact or calendar, CSS, Javascript, etc., WebOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via WebOS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the WebOS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
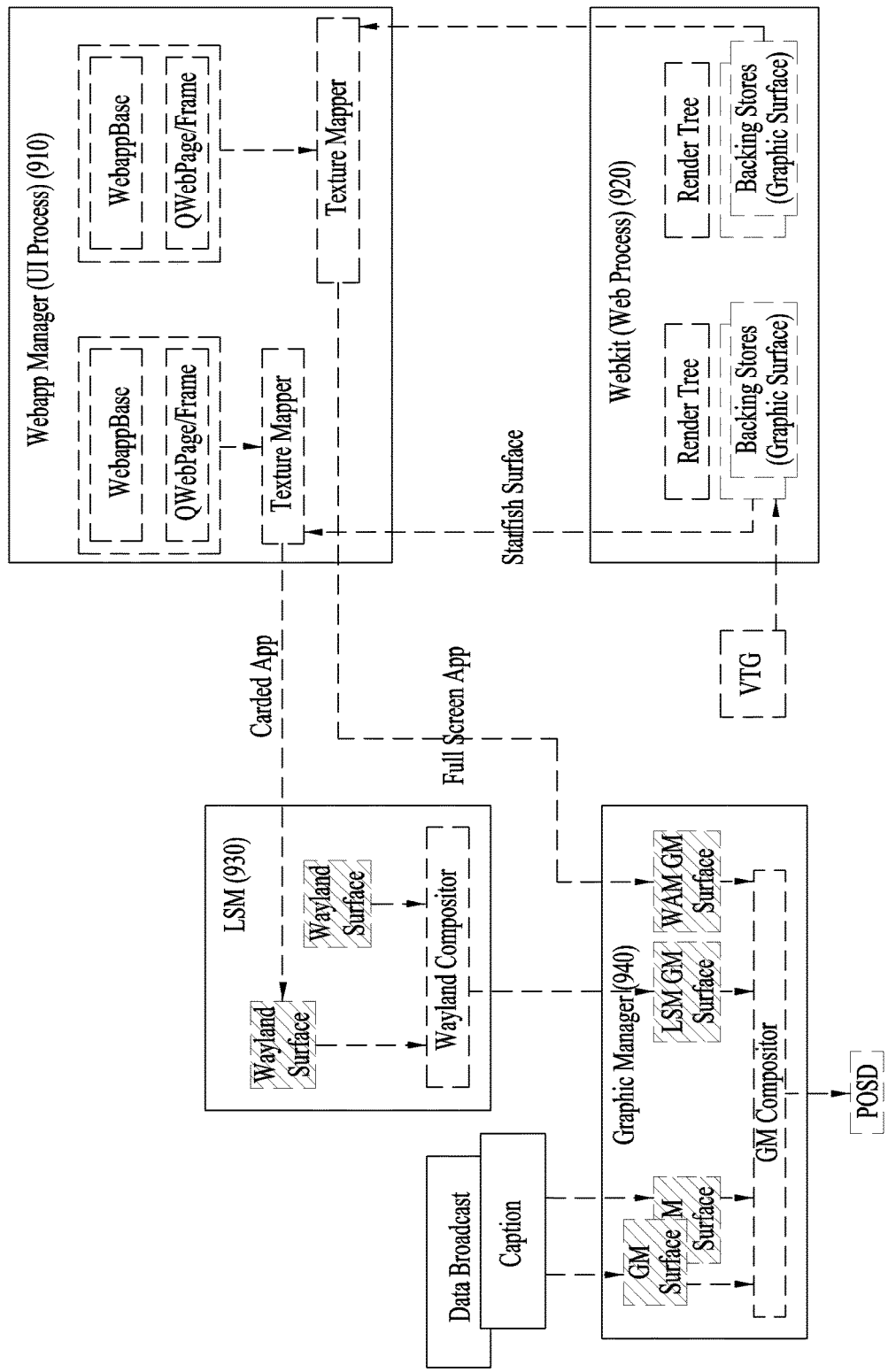
FIG. 9 is a diagram illustrating a graphic composition flow in a webOS device according to one embodiment of the present invention.

FIG. 9 is a diagram illustrating a graphic composition flow in a WebOS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the webOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
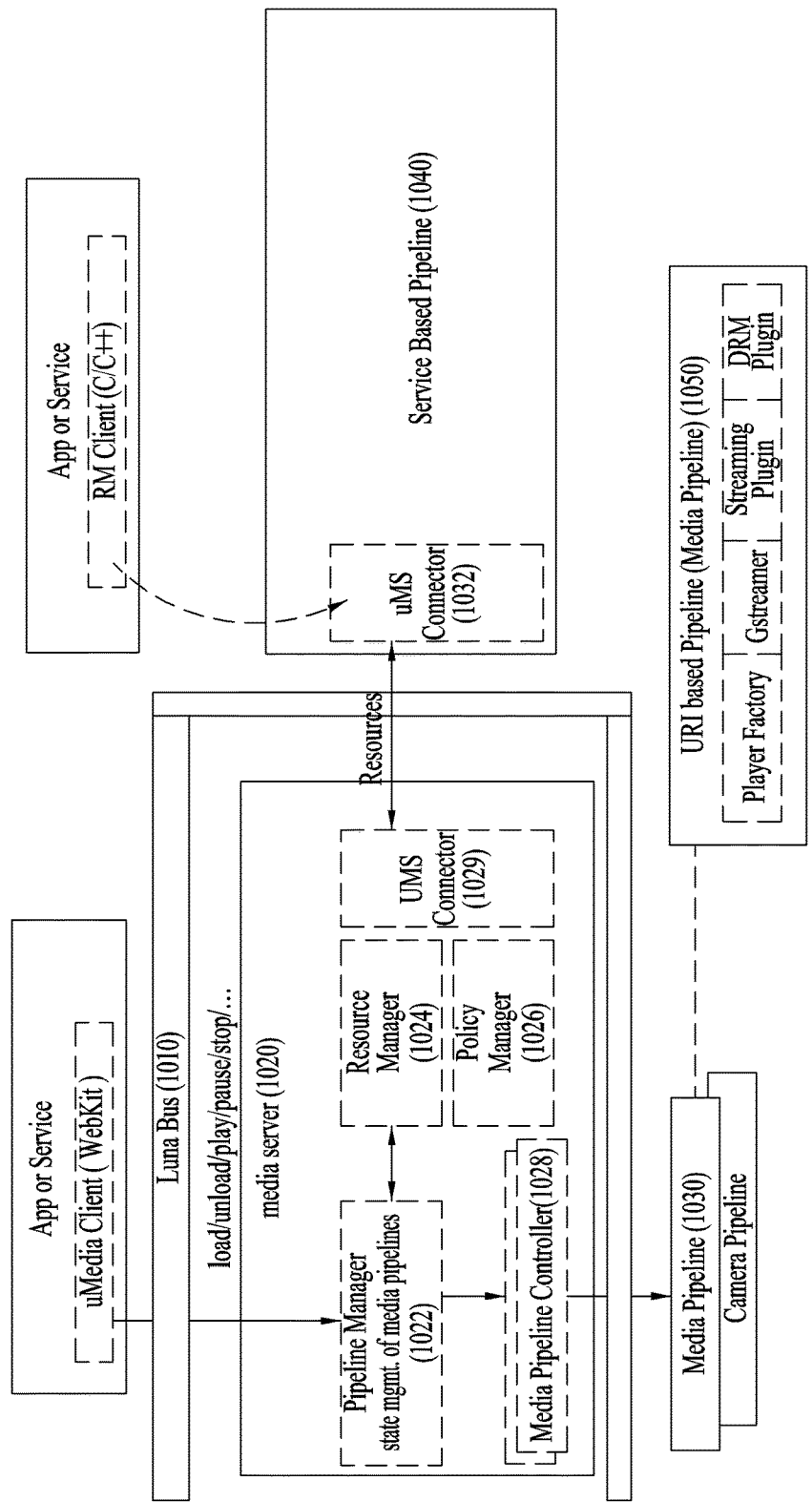
FIG. 10 is a diagram illustrating a media server according to one embodiment of the present invention.
Figure 11:
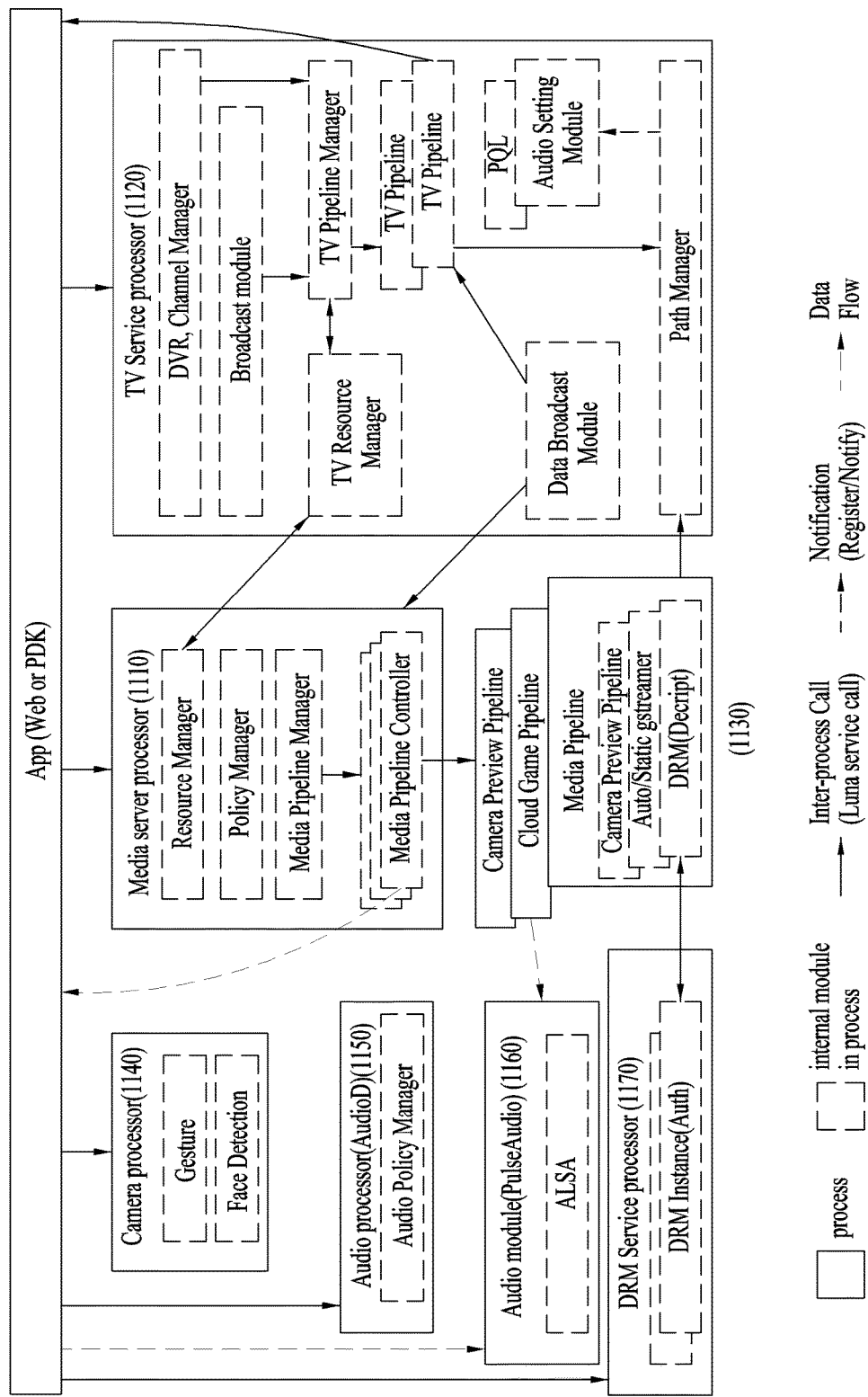
FIG. 11 is a block diagram showing the configuration of a media server according to one embodiment of the present invention.
Figure 12:
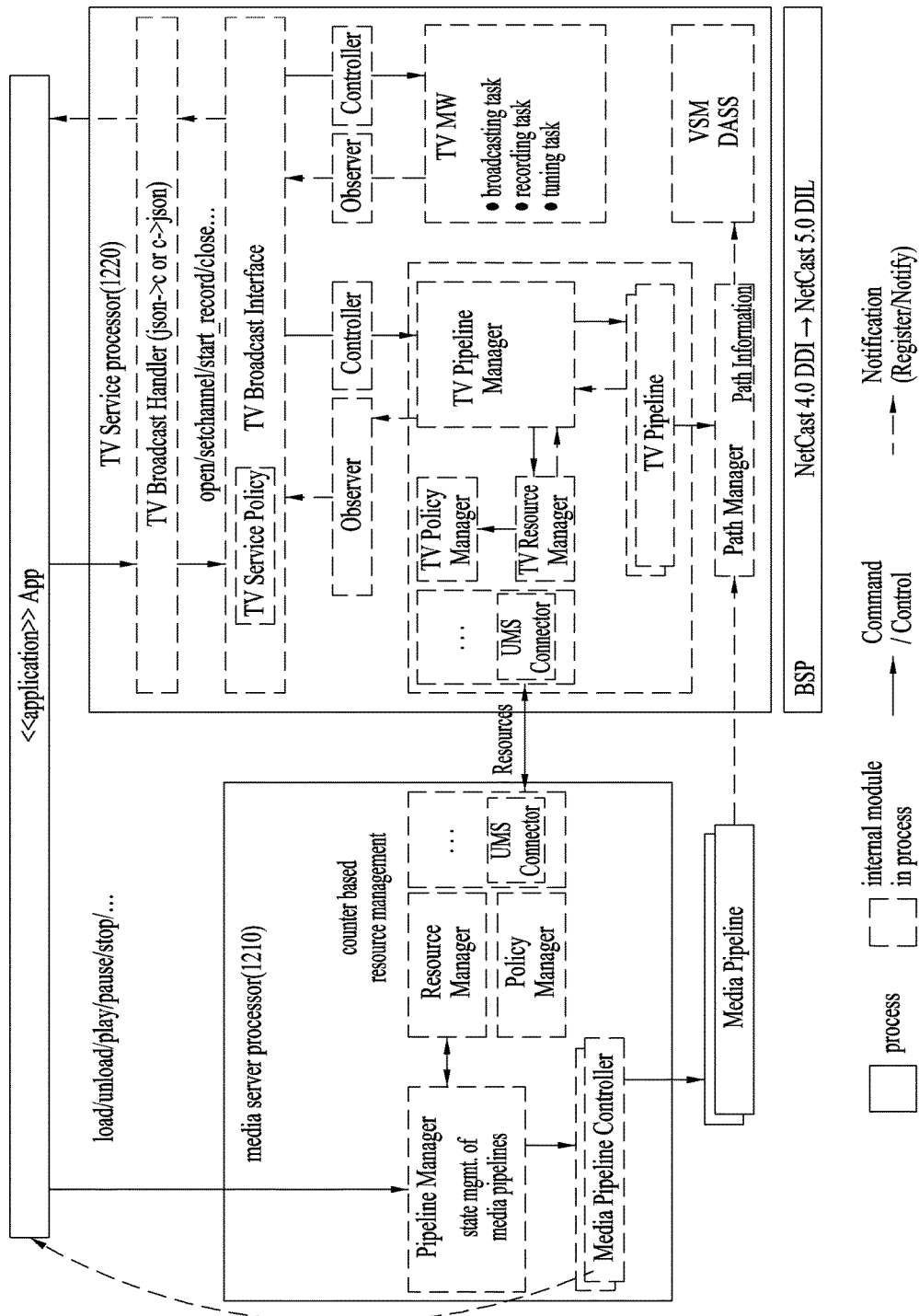
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the WebOS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-WebOS may be used. In this case, a Luna bus may be directly called to perform interfacing.

Seamless change is processed by a separate module (e.g., TVwin) and refers to a process of first displaying a TV program on a screen without a WebOS before or duration WebOS booting and then performing seamless processing. This is used for the purpose of first providing a basic function of a TV service, for fast response to a power-on request of a user, because a booting time of a WebOS is late. The module is a part of a TV service process and supports seamless change for providing fast booting and a basic TV function, factory mode, etc. The module is responsible for switching from the non-WebOS mode to the WebOS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (j son) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted.

In the present specification, the resource manager in the media server processor 1110/1210 may perform resource management to a counter base, for example.

Hereinafter, various embodiments of a digital device for processing a marquee service according to the present invention will be described in greater detail with reference to the accompanying drawings.

Figure 13:
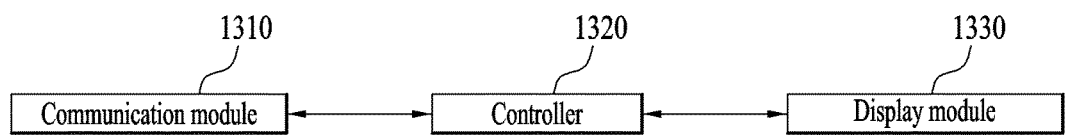
FIG. 13 is a block diagram of a digital device for processing a marquee related service.

FIG. 13 is a block diagram of a digital device for processing a marquee related service.

Referring to FIG. 13, a digital device may include a communication module 1310, a controller 1320 and a display module 1330.

In this case, the communication module 1310 receives text data by wire or wireless.

For instance, the communication module 1310 can connect Wi-Fi Direct for performing a device-to-device wireless communication and is also able to connect various wireless communications such as Wi-Fi, Bluetooth, Infrared communication, NFC (near field communication) and the like.

Subsequently, the display module 1330 can display the received text data within a text field.

The controller 1320 can control an operation of the digital device and performs a function of managing functions of at least one or more modules including the communication module 1310, the display module 1330 and the like overall.

The controller 1320 activates a text field on which the received text data will be displayed, checks whether an attribute type of the text field is a marquee attribute. As a result of the check, if the attribute type of the text field is the marquee attribute, the controller 1320 can perform a function of moving a text displayed within the text field in a preset direction.

As a result of the check, if the attribute type of the text field is not the marquee attribute, the controller 1320 checks whether the text data includes the marquee attribute. If the text data includes the marquee attribute, the controller 1320 can switch the attribute type of the text field to the marquee attribute.

For instance, as a result of the check, if the attribute type of the text field is not the marquee attribute, the controller 1320 checks whether the text data includes the marquee attribute. If the text data includes the marquee attribute, the controller 1320 checks whether a priority of the attribute of the text data is higher than that of the attribute of the text field. If the priority of the attribute of the text data is higher than that of the attribute of the text field, the controller may switch the attribute type of the text field to the marquee attribute.

For another instance, as a result of the check, if the attribute type of the text field is the marquee attribute, the controller 1320 extracts a setup value for the marquee attribute of the text field and is able to perform the marquee function of moving a text displayed within the text field in a preset direction.

For further instance, if a change request signal of a setup value is received, the controller 1320 creates and displays a setting change window. If the setup value is changed through the setting change window, the controller 1320 creates and displays a user equerry message window for querying whether to save the changed setup value. If a save request signal of the changed setup value is received from the user equerry message window, the controller 1320 may save the changed setup value.

Figure 14A:
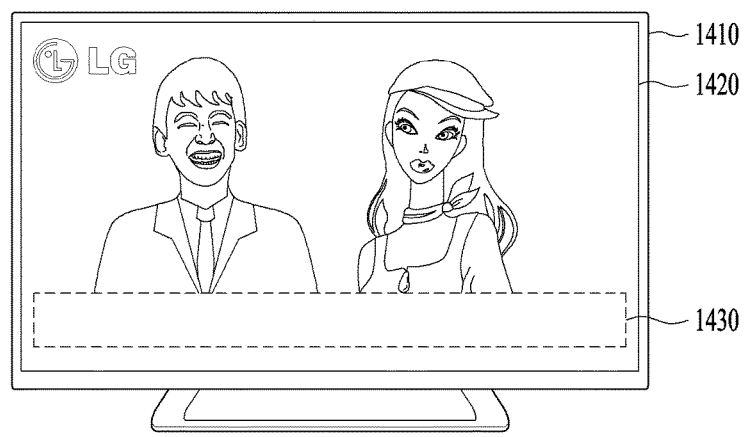
FIGS. 14A to 14C are diagrams to show a process for processing a marquee related service according to a first embodiment of the present invention.
Figure 14B:
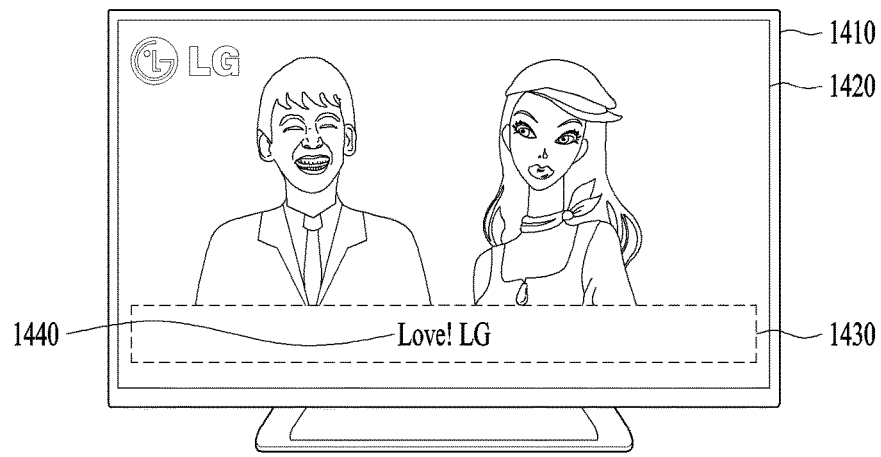
Figure 14C:

FIGS. 14A to 14C are diagrams to show a process for processing a marquee related service according to a first embodiment of the present invention.

Referring to FIGS. 14A to 14C, a digital device 1410 can display a received image or text data 1440 on a screen 1420 and is able to give a marquee animation function to a text field 1430 to enable the displayed text data 1440 to move in a prescribed direction.

For instance, as shown in FIG. 14A, if a prescribed text data is received, the digital device 1410 can activate a text field 1430, on which the received text data is intended to be displayed, on the screen 1420.

Subsequently, referring to FIG. 14B, the digital device 1410 displays a text data 1440 within the activated text field 1430.

The digital device 1410 then checks whether an attribute type of the text field 1430 is a marquee attribute.

For instance, the digital device 1410 checks whether the text data 1440 displayed within the text field 1430 exceeds a size of the text field 1430. As a result, if the displayed text data 1440 exceeds the size of the text field 1430, the digital device 1410 may check whether the attribute type of the text field 1430 is the marquee attribute.

In this case, only if a capacity of the text data 1440 exceeds the size of the text field 1430, the digital device 1410 can perform a marquee function.

For another instance, when the digital device 1410 checks whether the attribute type of the text field 1430 is the marquee attribute, as a result of the check, if the attribute type of the text field 1430 is not the marquee attribute, the digital device 1410 checks whether the text data 1440 includes the marquee attribute. As a result of the check, if the text data 1440 includes the marquee attribute, the digital device 1410 may switch the attribute type of the text field 1430 to the marquee attribute.

In this case, the digital device 1410 may determine whether to perform the marquee function by analyzing the attribute type of the text data 1440 as well as the attribute type of the text field 1430.

In doing so, when the digital device 1410 switches the attribute of the text field 1430 to the marquee attribute, if the text data 1440 includes the marquee attribute, the digital device 1410 creates and displays a user query message window for querying whether to switch the text field 1430 to the marquee attribute. If a marquee attribute switch request signal of the text field 1430 is received from the user query message window, the digital device 1410 may switch the attribute type of the text field 1430 to the marquee attribute.

In this case, a user may not desire to switch the attribute type of the text field 1430 to the marquee attribute. To prevent such switching, the digital device 1410 displays the user query message window for querying whether to switch the text field 1430 to the marquee attribute, thereby providing the user with convenience.

For further instance, when the digital device 1410 checks whether the attribute type of the text field 1430 is the marquee attribute, if the attribute type of the text field 1430 is not the marquee attribute, the digital device 1410 checks whether the text data 1440 includes the marquee attribute. If the text data 1440 includes the marquee attribute, the digital device 1410 checks whether a priority of the attribute of the text data 1440 is higher than that of the attribute of the text field 1430. If the priority of the attribute of the text data 1440 is higher than that of the attribute of the text field 1430, the digital device 1410 may switch the attribute type of the text field 1430 to the marquee attribute.

In this case, the digital device 1410 can determine whether to perform the marquee function by analyzing the attribute type of the text data 1440 as well as the attribute type of the text field 1430, and more particularly, by depending on a higher priority attribute.

For example, when the marquee attribute is not included in the text field 1430 but included in the text data 1440, if the priority of the attribute of the text field 1430 is higher than that of the attribute of the text data 1440, the marquee function may not be performed. Yet, if the priority of the attribute of the text field 1430 is lower than that of the attribute of the text data 1440, the marquee function may be performed.

In doing so, when the digital device 1410 switches the attribute of the text field 1430 to the marquee attribute, if the priority of the attribute of the text data 1440 is higher than that of the attribute of the text field 1430, the digital device 1410 creates and displays a user query message window for querying whether to switch the text field 1430 to the marquee attribute. If a marquee attribute switch request signal of the text field 1430 is received from the user query message window, the digital device 1410 may switch the attribute type of the text field 1430 to the marquee attribute.

Referring to FIG. 14C, if the attribute type of the text field 1430 is the marquee attribute, the digital device 1410 can perform a marquee animation function of moving a text displayed within the text field 1430 in a preset direction.

In doing so, when the digital device 1410 moves the text displayed within the text field 1430 in the preset direction, if the attribute type of the text field 1430 is the marquee attribute, the digital device 1410 extracts a setup value for the marquee attribute of the text field 1430 and is then able to perform the marquee animation function of moving the text displayed within the text field 1430 in the preset direction according to the extracted setup value.

In this case, the setup value may include a text moving direction, a text moving speed, a text moving control signal, a text moving repeated count, a text moving quantity, or the like, by which the setup value is non-limited.

For example, the text moving control signal may include a cursor signal of a remote controller, a user's touch signal, a user's gesture signal, a user's pupil motion signal, or the like.

In some cases, the setup value may be changed according to a country language of a text.

For example, with respect to the country language of the text, since Korean, English or the like is arranged to be readable in left-to-right direction, the marquee animation function can be given in a manner of moving Korean or English text in right-to-left direction.

For another example, with respect to the country language of the text, since Hebrew is arranged to be readable in right-to-left direction, the marquee animation function can be given in a manner of moving Hebrew text in left-to-right direction.

Therefore, the present invention varies a setup value according to a country language of a text, thereby providing a user with convenience.

For another instance, a setup value may be changed according to a type of the text field 1430.

For example, a type of the text field 1430 may include a broadcast program related EPG type, a news caption type, a movie caption type, a song lyric type, or the like.

When the text field 1430 of a prescribed type includes a multitude of subfields, a setup value of a subfield may be equal to that of the text field 1430.

Namely, the setup value of the subfield may depend on a main setup value of the text field 1430.

Yet, in some cases, when the text field 1430 of a prescribed type includes a multitude of subfields, a setup value of a subfield may be different from that of the text field 1430.

Namely, the setup value of the subfield may not depend on a main setup value of the text field 1430.

In this case, when the text field 1430 of a prescribed type includes a multitude of subfields, the subfields may differ from each other in setup value. Yet, in some cases, the setup values of the subfields may be equal to each other.

When the digital device 1410 moves a text displayed within the text field 1430 in a preset direction, if a setup value change request signal is received, the digital device 1410 displays a setting change window. If a setup value is changed through the setting change window, the digital device 1410 creates and generates a user query message window for querying whether to save the changed setup value. If a save request signal of the changed setup value is received from the user equerry message window, the digital device 1410 can save the changed setup value.

In this case, a user may not desire to change the setup value of the text field 1430. To prevent this, the digital device 1410 displays the user query message window for querying whether to change the setup value of the text field 1430, thereby providing the user with convenience.

Figure 15A:
FIG. 15A and FIG. 15B are diagrams to show a process for processing a marquee related service according to a second embodiment of the present invention.
Figure 15B:
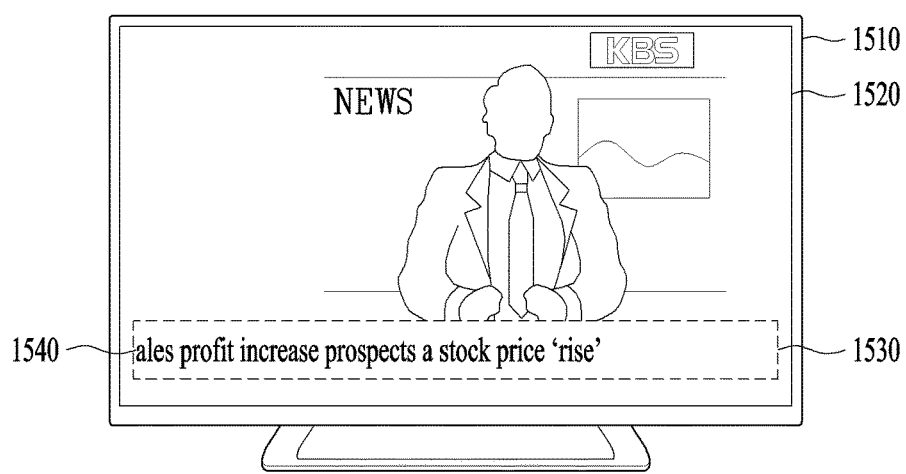

FIG. 15A and FIG. 15B are diagrams to show a process for processing a marquee related service according to a second embodiment of the present invention.

Referring to FIG. 15A and FIG. 15B, a digital device 1510 can display a received image or text data 1540 on a screen 1520 and is able to give a marquee animation function to a text field 1530 to enable the displayed text data 1540 to move in a prescribed direction.

For example, as shown in FIG. 15A, if a prescribed text data is received, the digital device 1510 can activate a text field 1530, on which the received text data is intended to be displayed, on the screen 1520.

Subsequently, the digital device 1510 displays a text data 1540 within the activated text field 1530. The digital device 1510 then checks whether the text data 1540 displayed within the text field 1530 exceeds a size of the text field 1530. As a result of the check, if the displayed text data 1540 exceeds the size of the text field 1530, the digital device 1510 can check whether an attribute type of the text field 1530 is a marquee attribute.

Referring to FIG. 15B, if the attribute type of the text field 1530 is the marquee attribute, the digital device 1510 can perform a marquee animation function of moving the text displayed within the text field 1530 in a preset direction.

In this case, only if a capacity of the text data 1540 exceeds the size of the text field 1530, the digital device 1510 can perform a marquee function.

Figure 16A:
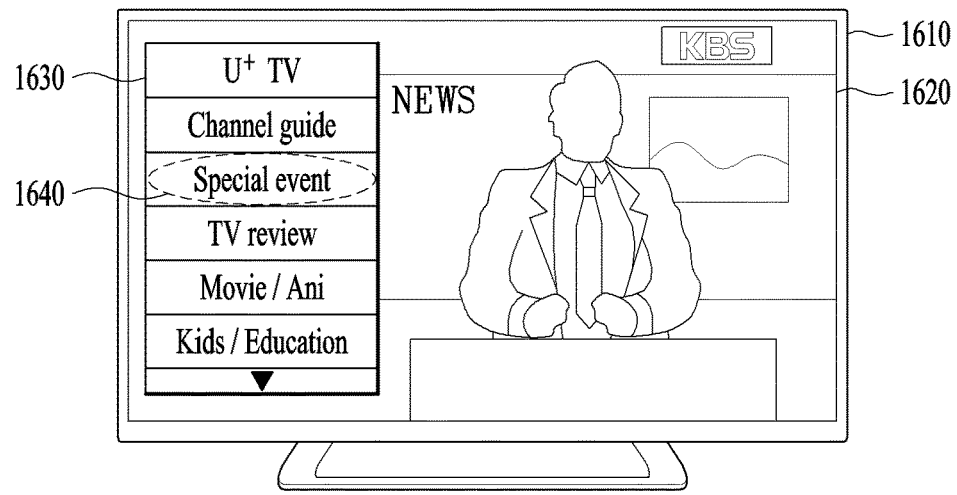
FIG. 16A and FIG. 16B are diagrams to show a process for processing a marquee related service according to a third embodiment of the present invention.
Figure 16B:
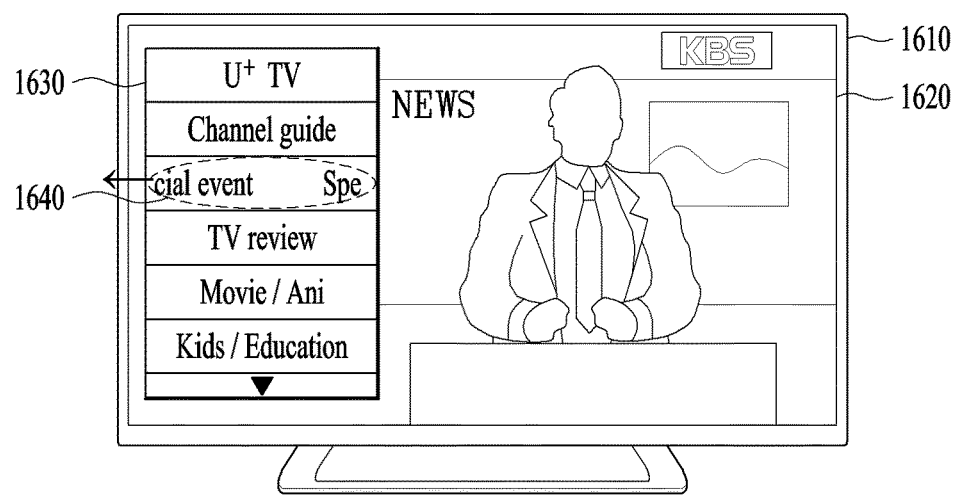

FIG. 16A and FIG. 16B are diagrams to show a process for processing a marquee related service according to a third embodiment of the present invention.

Referring to FIG. 16A and FIG. 16B, a digital device 1610 can display a received image or text data 1640 on a screen 1620 and is able to give a marquee animation function to a text field 1630 to enable the displayed text data 1640 to move in a prescribed direction.

For example, as shown in FIG. 16A, if a text data of a broadcast program related EPG type is received, the digital device 1610 can activate a text field 1630, on which the received text data is intended to be displayed, on the screen 1620.

Subsequently, the digital device 1610 displays a text data 1640 within the activated text field 1630 and is able to check whether an attribute type of the text field 1630 is a marquee attribute.

In doing so, when the digital device 1610 checks whether the attribute type of the text field 1630 is the marquee attribute, if the attribute type of the text field 1630 is not the marquee attribute, the digital device 1610 checks whether the text data 1640 includes the marquee attribute. If the text data 1640 includes the marquee attribute, the digital device 1610 may switch the attribute type of the text field 1630 to the marquee attribute.

Namely, referring to FIG. 16B, if a special event related text data 1640 in the text data 1640 of the broadcast program related EPG type includes the marquee attribute, the digital device 1610 can perform a marquee animation function of moving the text 'special event' displayed within the text field 1630 in a preset direction.

Thus, the present invention gives a marquee animation function to a corresponding text in a manner that a marquee attribute is included in a text data requiring user's concern and intention, thereby providing the user with advertisement and PR (public relations) effects.

In particular, the digital device 1610 may determine whether to perform the marquee function by analyzing the attribute type of the text data 1640 as well as the attribute type of the text field 1630.

Figure 17:
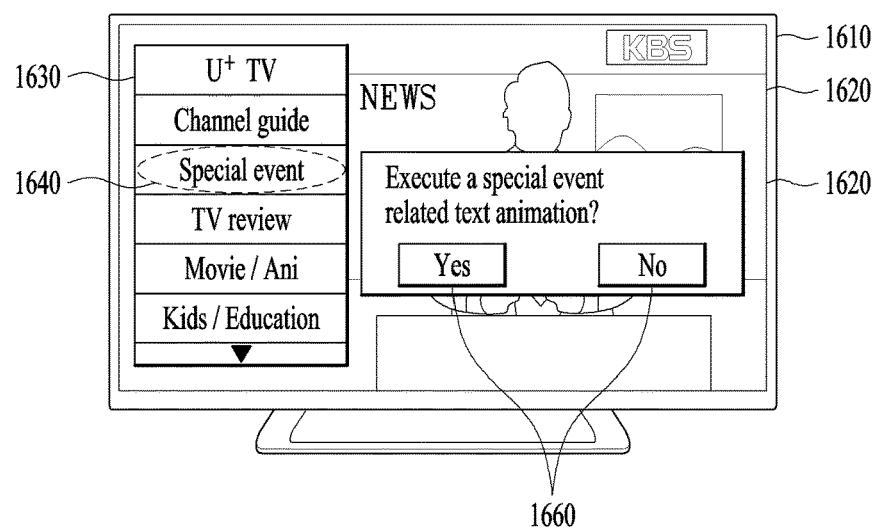
FIG. 17 is a diagram to show a process for processing a marquee related service according to a fourth embodiment of the present invention.

FIG. 17 is a diagram to show a process for processing a marquee related service according to a fourth embodiment of the present invention.

Referring to FIG. 17, when a digital device 1710 checks whether an attribute type of a text field 1630 is a marquee attribute, if the attribute type of the text field 1630 is not the marquee attribute, the digital device 1710 checks whether the text data 1640 includes the marquee attribute. If the text data 1640 includes the marquee attribute, the digital device 1710 may switch the attribute type of the text field 1630 to the marquee attribute.

In doing so, when the digital device 1710 switches the attribute of the text field 1630 to the marquee attribute, if the text data 1640 includes the marquee attribute, the digital device 1710 creates and displays a user query message window 1650 for querying whether to switch the text field 1630 to the marquee attribute.

For example, a marquee attribute switch approve button 1660 and a marquee attribute switch decline button 1660 of the text field 1630 can be included in the user query message window 1650 for querying whether to switch the text field 1630 to the marquee attribute.

Hence, if a marquee attribute switch request signal of the text field 1630 is received from the user query message window 1650, the digital device 1710 may switch the attribute type of the text field 1630 to the marquee attribute.

For example, if a special event related text data 1640 in the text data 1640 of the broadcast program related EPG type includes the marquee attribute, the digital device 1710 switches an attribute type of the text field 1630, on which a text 'special event' is displayed, to the marquee attribute and is able to perform a marquee animation function of moving the text 'special event' displayed within the text field 1630 in a preset direction.

In this case, a user may not desire to switch the attribute type of the text field 1630 to the marquee attribute. To prevent such switching, the digital device 1710 displays the user query message window 1650 for querying whether to switch the text field 1630 to the marquee attribute, thereby providing the user with convenience.

FIGS. 18A to 18D are diagrams to show a process for processing a marquee related service according to a fifth embodiment of the present invention.

Referring to FIGS. 18A to 18D, a digital device 1810 can display a received image or text data 1840 on a screen 1820 and is able to give a marquee animation function to a text field 1830 to enable the displayed text data 1840 to move in a prescribed direction.

For example, when the digital device 1810 moves the text displayed within the text field 1830 in the preset direction, if the attribute type of the text field 1830 is the marquee attribute, the digital device 1810 extracts a setup value for the marquee attribute of the text field 1830 and is then able to perform the marquee animation function of moving the text displayed within the text field 1830 in the preset direction according to the extracted setup value.

In this case, the setup value may include a text moving direction, a text moving speed, a text moving control signal, a text moving repeated count, a text moving quantity, or the like, by which the setup value is non-limited.

For example, the text moving control signal may include a cursor signal of a remote controller, a user's touch signal, a user's gesture signal, a user's pupil motion signal, or the like.

Figure 18A:
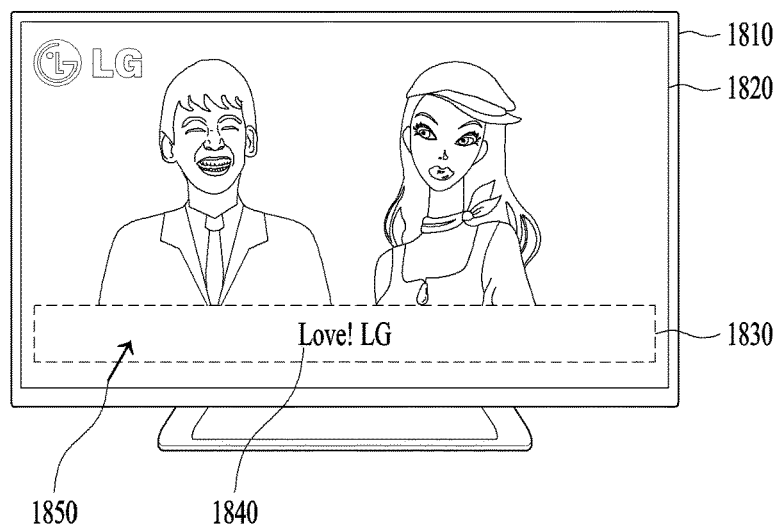
FIGS. 18A to 18D are diagrams to show a process for processing a marquee related service according to a fifth embodiment of the present invention.

Referring to FIG. 18A, when the text moving control signal is set to a cursor signal 1850 of the remote controller, if the cursor signal 1850 is located within the text field 1830, the text data 1840 within the text field 1830 can move in the preset direction.

Figure 18B:
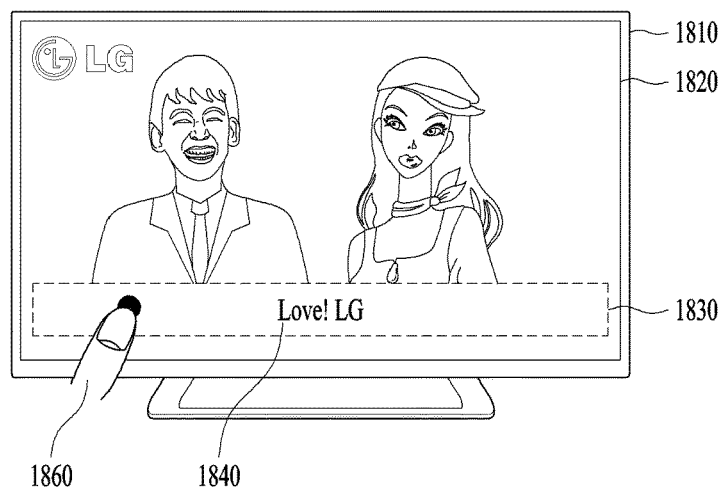

For instance, referring to FIG. 18B, when the text moving control signal is set to a user's touch signal 1860, if the user's touch signal 1860 touches the text field 1830, the text data 1840 within the text field 1830 can move in the preset direction.

Figure 18C:
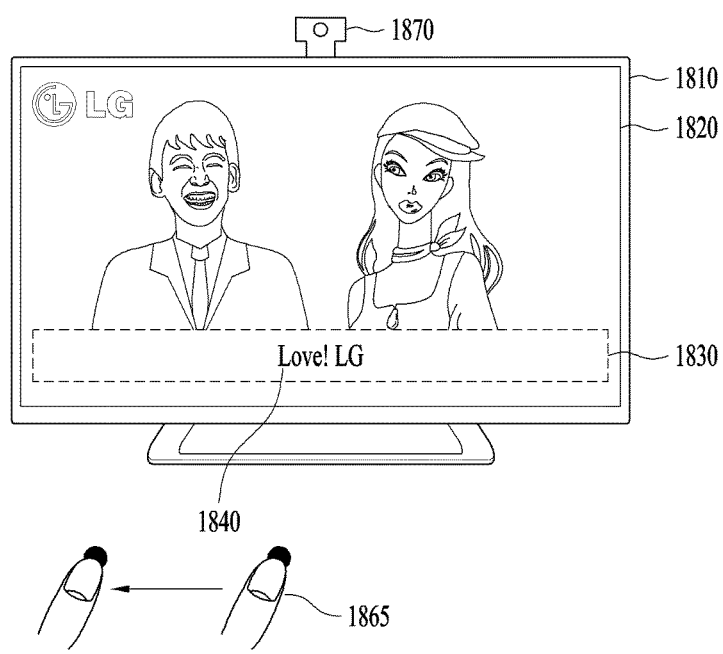

For another instance, referring to FIG. 18C, when the text moving control signal is set to a user's gesture signal 1865, if the user's gesture signal 1865 is recognized by a camera 1870, the text data 1840 within the text field 1830 can move in the preset direction.

Figure 18D:
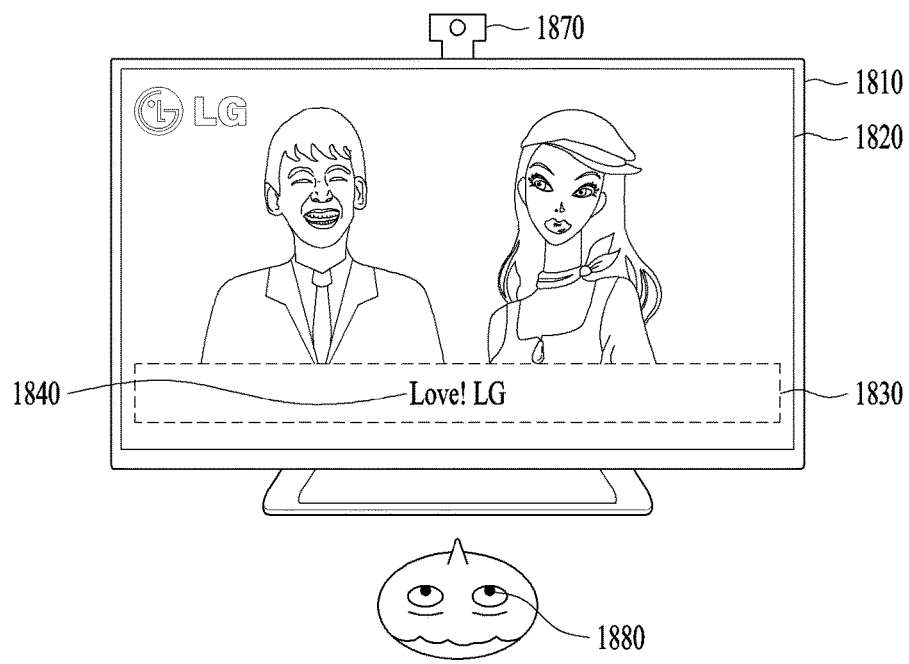

For further instance, referring to FIG. 18D, when the text moving control signal is set to a user's pupil motion signal 1880, if the user's pupil motion signal 1880 is recognized by the camera 1870, the text data 1840 within the text field 1830 can move in the preset direction.

Figure 19:
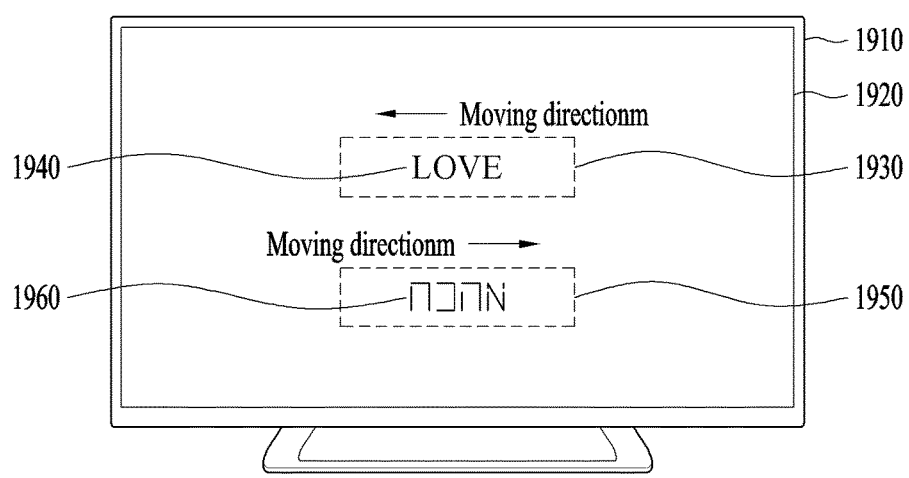
FIG. 19 is a diagram to show a process for processing a marquee related service according to a sixth embodiment of the present invention.

FIG. 19 is a diagram to show a process for processing a marquee related service according to a sixth embodiment of the present invention.

Referring to FIG. 19, a digital device 1910 extracts a setup value for a marquee attribute of a text field 1930 and is then able to perform a marquee animation function of moving a text displayed within the text field 1930 in a preset direction according to the extracted setup value.

In this case, the setup value may include a text moving direction, a text moving speed, a text moving control signal, a text moving repeated count, a text moving quantity, or the like, by which the setup value is non-limited.

In doing so, the setup value may be changed according to a country language of a text.

For example, as shown in FIG. 19, on a screen 1920 of the digital device 1910, with respect to the country language of the text, an English text 1940 is displayed within a first text field 1930 and a Hebrew text 1960 can be displayed within a second text field 1950.

In this case, with respect to the country language of the text, since Korean, English or the like is arranged to be readable in left-to-right direction, the marquee animation function can be given in a manner of moving the Korean or English text 1940 in right-to-left direction.

Moreover, with respect to the country language of the text, since Hebrew is arranged to be readable in right-to-left direction, the marquee animation function can be given in a manner of moving the Hebrew text 1960 in left-to-right direction.

Therefore, the present invention varies a setup value according to a country language of a text, thereby providing a user with convenience.

Figure 20A:
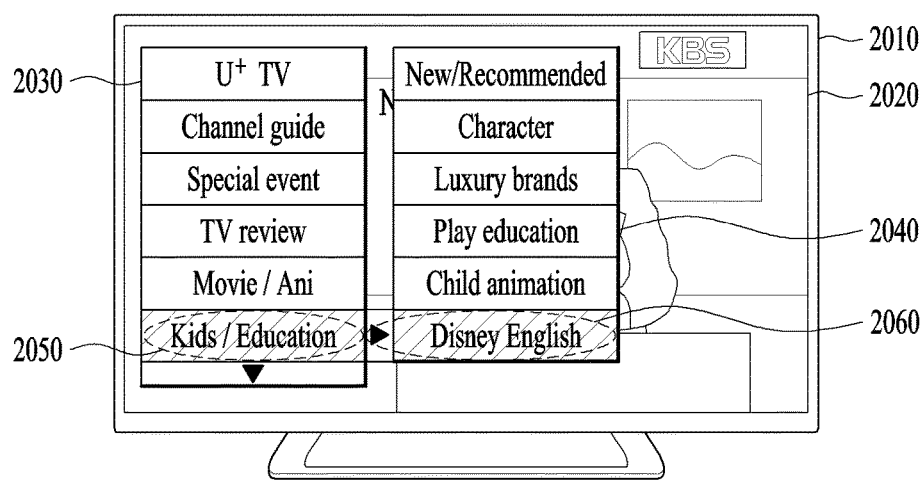
FIG. 20A and FIG. 20B are diagrams to show a process for processing a marquee related service according to a seventh embodiment of the present invention.
Figure 20B:
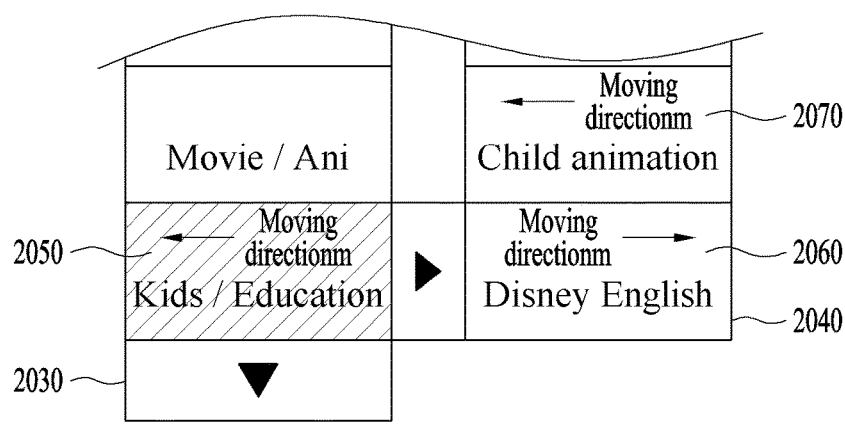

FIG. 20A and FIG. 20B are diagrams to show a process for processing a marquee related service according to a seventh embodiment of the present invention.

Referring to FIG. 20A and FIG. 20B, a digital device 2010 extracts a setup value for a marquee attribute of a text field and is then able to perform a marquee animation function of moving a text displayed within the text field in a preset direction according to the extracted setup value.

In this case, the setup value may include a text moving direction, a text moving speed, a text moving control signal, a text moving repeated count, a text moving quantity, or the like, by which the setup value is non-limited.

In doing so, the setup value may be changed according to a type of the text field.

For example, the type of the text field may include a broadcast program related EPG type, a news caption type, a movie caption type, a song lyric type, or the like.

Namely, with respect to the type of the text field, the broadcast program related EPG type and the news caption type may differ from each other in a moving speed related setup value.

Moreover, referring to FIG. 20A, when a text field 2030 of the broadcast program related EPG type includes a multitude of subfields 2040, a setup value of the subfield 2040 may be equal to that of the text field 2030.

Namely, the setup value of the subfield 2040 may depend on a main setup value of the text field 2030.

For example, in the text field 2030 of the broadcast program related EPG type, when a text field of a kids/education item 2050 includes a multitude of subfields 2040, a text moving direction related setup value of a subfield of a Disney English item 2060 may be equal to that of a text field of the kids/education item 2050, or may be different from that of text field of the kids/education item 2050 [FIG. 20B].

Namely, the setup value of the subfield 2040 may not depend on the main setup value of the text field 2030.

In some cases, the setup values of the respective subfields may be different from or equal to each other.

For example, as shown in FIG. 20B, the text moving direction related setup value of the subfield of the Disney English item 2060 may be different from that of the subfield of an child animation item 2070.

Figure 21A:
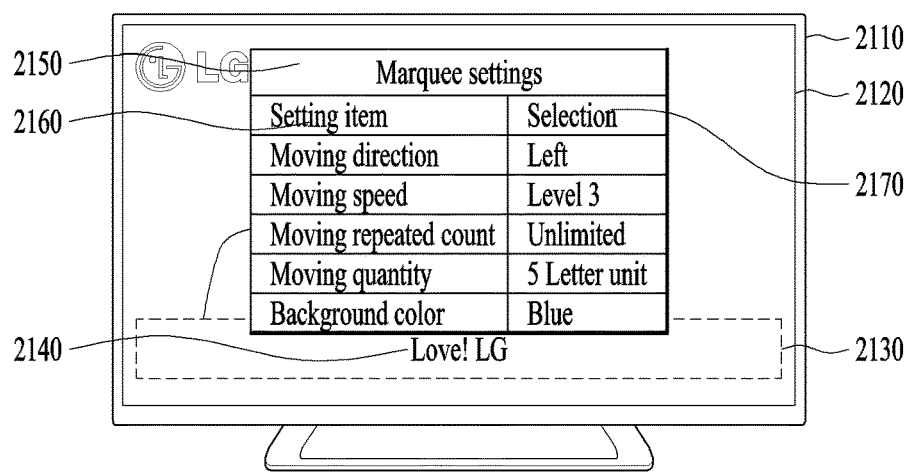
FIG. 21A and FIG. 21B are diagrams to show a process for processing a marquee related service according to an eighth embodiment of the present invention.
Figure 21B:
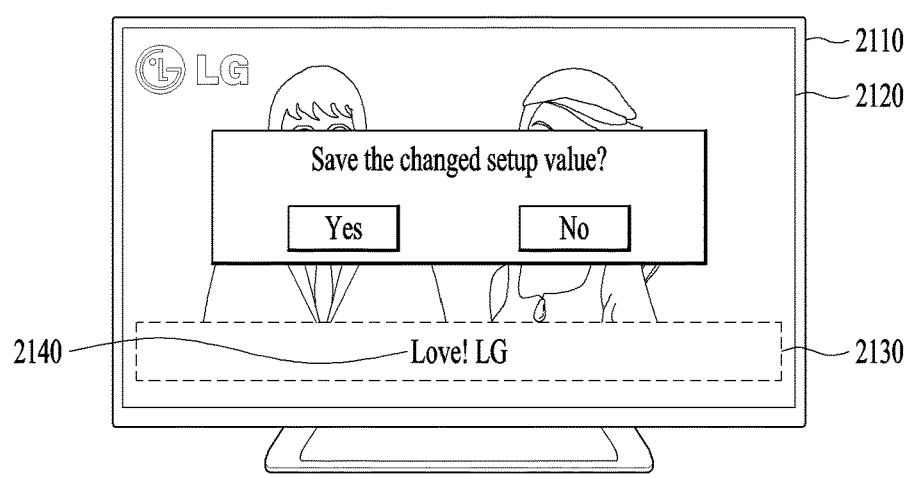

FIG. 21A and FIG. 21B are diagrams to show a process for processing a marquee related service according to an eighth embodiment of the present invention.

Referring to FIG. 21A and FIG. 21B, a digital device 2110 extracts a setup value for a marquee attribute of a text field and is then able to perform a marquee animation function of moving a text displayed within the text field in a preset direction according to the extracted setup value.

In this case, the setup value may include a text moving direction, a text moving speed, a text moving control signal, a text moving repeated count, a text moving quantity, or the like, by which the setup value is non-limited.

Referring to FIG. 21A, when the digital device 2110 moves a text displayed within a text field in a preset direction, if a setup value change request signal is received, the digital device 2110 displays a setting change window 2150 on a screen 2120.

In this case, the setting change window 2150 may include a setting item 2160 and a setup value select item 2170.

For example, the setting item 2160 of the setting change window 2150 may include a text moving direction, a text moving speed, a text moving repeated count, a text moving quantity, a background color of a text filed and the like, by which the example is non-limited.

The setup value select item 2170 of the setting change window 2150 may input or select a numerical value of each setting item 2160 or the like.

Referring to FIG. 21B, if a setup value is changed through the setting change window 2150, the digital device 2110 creates and generates a user query message window 2180 for querying whether to save the changed setup value. If a save request signal of the changed setup value is received from the user equerry message window 2180, the digital device 2110 can save the changed setup value.

For example, in the user query message window 2180 for querying whether to save the changed setup value, a changed setup value saving approve button 2910 and a changed setup value saving decline button 2190 can be included.

In this case, a user may not desire to change the setup value of the text field 2130. To prevent this, the digital device 2110 displays the user query message window 2180 for querying whether to change the setup value of the text field 2130, thereby providing the user with convenience.

FIGS. 22 to 26 are flowcharts to describe a method of processing a service in a digital device according to the present invention.

Figure 22:
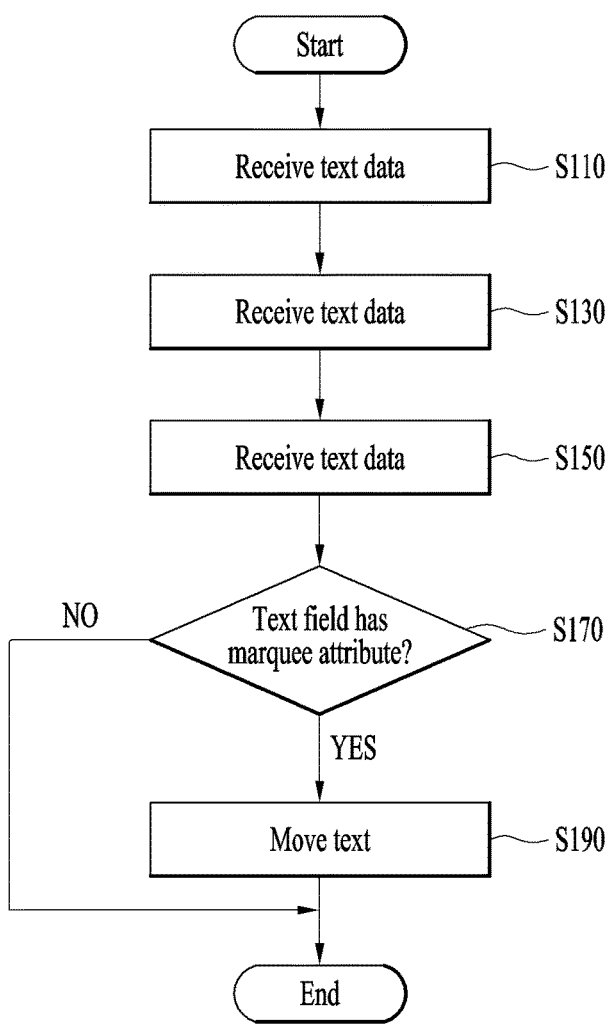
FIGS. 22 to 26 are flowcharts to describe a method of processing a service in a digital device according to the present invention.

Referring to FIG. 22, a digital device receives text data [S110] and is able to activate a text field in which the received text data is intended to be displayed [S130].

Subsequently, the digital device displays the text data within the activated text field [S150] and is able to check an attribute type of the text field is a marquee attribute [S170].

As a result of the check, if the attribute type of the text field is the marquee attribute, the digital device performs a marque animation of moving the text displayed within the text field in a preset direction [S190]. If the attribute type of the text field is not the marquee attribute, the digital device can end the job.

In doing so, when the digital device performs the marquee animation function of moving the text displayed within the text field in the preset direction, the digital device extracts a setup value for the marquee attribute of the text field and is then able to move the text displayed within the text field 1930 in the preset direction according to the extracted setup value.

In this case, the setup value may include a text moving direction, a text moving speed, a text moving control signal, a text moving repeated count, a text moving quantity, or the like. For example, the text moving control signal may include a cursor signal of a remote controller, a user's touch signal, a user's gesture signal, a user's pupil motion signal, or the like.

In some cases, the setup value may be changed according to a country language of a text or a type of a text field.

When the text field of a prescribed type includes a multitude of subfields, a setup value of a subfield may be equal to or different from that of the text field.

Moreover, when the text field of a prescribed type includes a multitude of subfields, the subfields may differ from each other in setup value.

Figure 23:
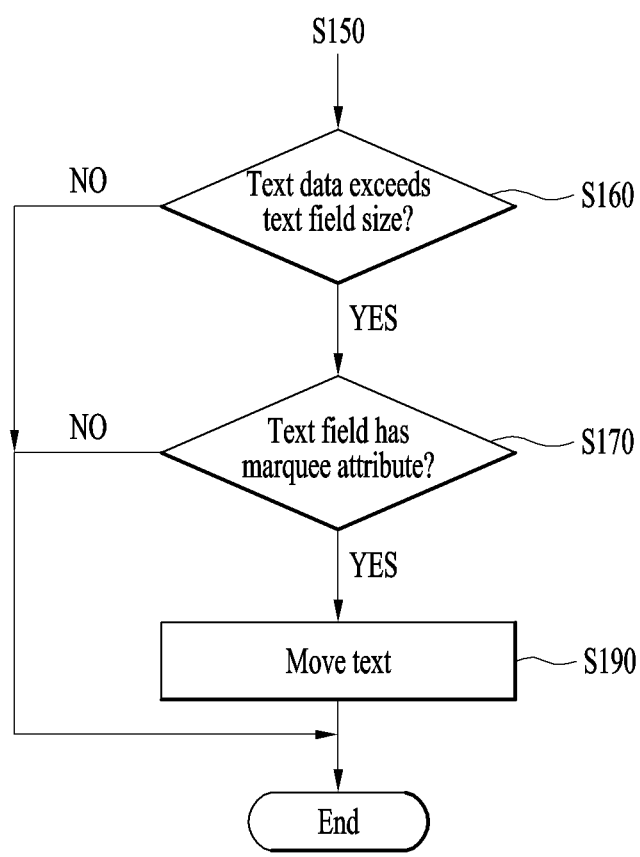

In some cases, referring to FIG. 23, when the digital device checks whether an attribute type of the text field is a marquee attribute, it is able to check whether the text data displayed within the text field exceeds a size of the text field [S160].

As a result of the check, if the displayed text data exceeds the size of the text field, the digital device checks whether the attribute type of the text field is the marquee type [S170]. If the displayed text data does not exceed the size of the text filed, the digital device can end the job.

Subsequently, as a result of the check, if the attribute type of the text field is the marquee type, the digital device performs a marquee animation of moving the text displayed within the text field in a preset direction [S190]. If the attribute type of the text field is not the marquee type, the digital device can end the job.

Figure 24:
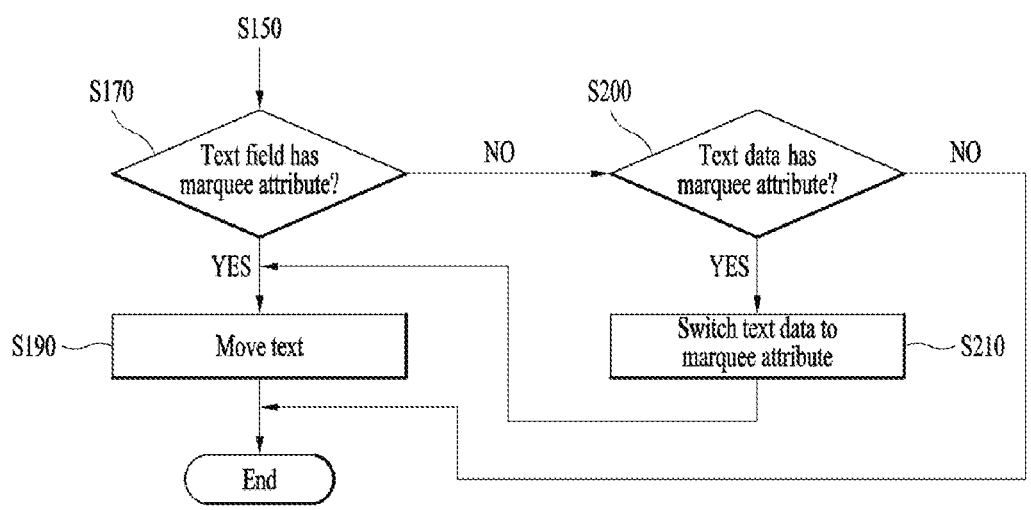

For another instance, referring to FIG. 24, when the digital device checks whether the attribute type of the text field is the marquee attribute [S170], if the attribute type of the text field is the marquee type, the digital device performs a marquee animation of moving the text displayed within the text field in a preset direction [S190]. If the attribute type of the text field is not the marquee type, the digital device checks whether the text data includes the marquee attribute [S200].

As a result of the check, if the text data includes the marquee attribute, the digital device switches the attribute type of the text field to the marquee attribute [S210] and is able to perform a marquee animation of moving the text displayed within the text field switched to the marquee attribute in a preset direction [S190].

Yet, as a result of the check, if the text data does not include the marquee attribute, the digital device can end the job.

In some cases, when the digital device switches the attribute type of the text filed to the marquee attribute, if the text data includes the marquee attribute, the digital device creates and displays a user query message window for querying whether to switch the text field to the marquee attribute. If a marquee attribute switch request signal of the text field is received from the user query message window, the digital device may switch the attribute type of the text field to the marquee attribute.

Figure 25:
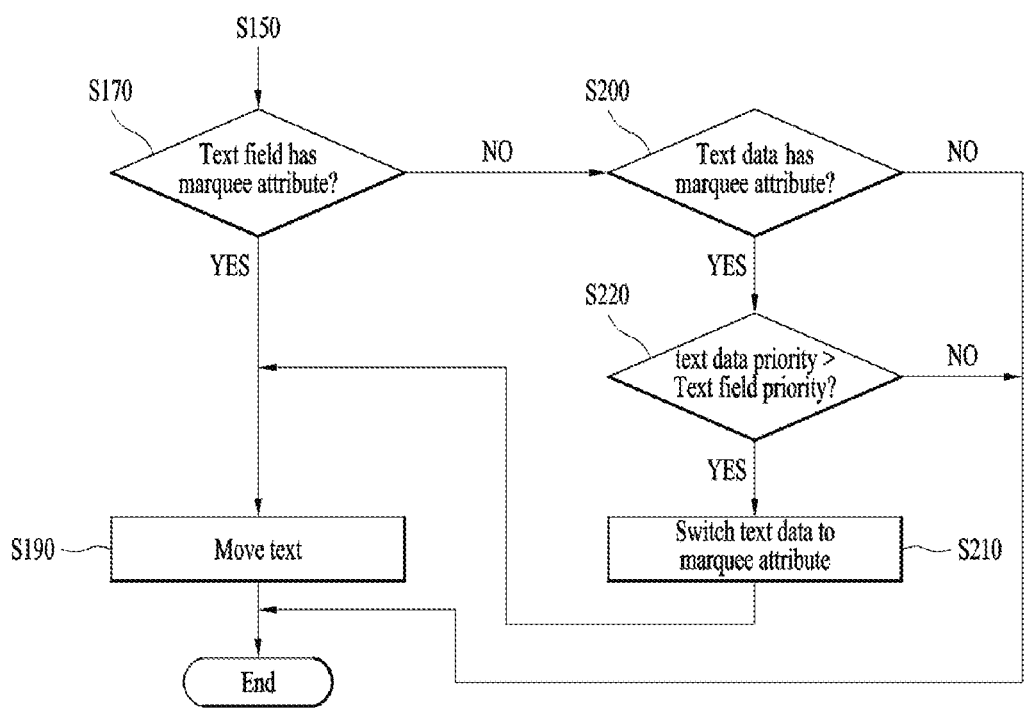

For another instance, referring to FIG. 25, when the digital device checks whether the attribute type of the text field is the marquee attribute [S170], if the attribute type of the text field is the marquee type, the digital device performs a marquee animation of moving the text displayed within the text field in a preset direction [S190]. If the attribute type of the text field is not the marquee type, the digital device checks whether the text data includes the marquee attribute [S200].

As a result of the check, if the text data includes the marquee attribute, the digital device checks whether a priority of the attribute of the text data is higher than that of the attribute of the text field [S220]. If the text data does not include the marquee attribute, the digital device can end the job.

As a result of the check, if the priority of the attribute of the text data is higher than that of the attribute of the text field, the digital device switches the attribute type of the text field to the marquee attribute [S210] and is able to perform a marquee animation of moving the text displayed within the text field switched to the marquee attribute in a preset direction [S190].

Yet, as a result of the check, if the priority of the attribute of the text data is equal to or lower than that of the attribute of the text field, the digital device can end the job.

In some cases, when the digital device switches the attribute type of the text field to the marquee attribute, if the priority of the attribute of the text data is higher than that of the attribute of the text field, the digital device creates and displays a user query message window for querying whether to switch the text field to the marquee attribute. If a marquee attribute switch request signal of the text field is received from the user query message window, the digital device may switch the attribute type of the text field to the marquee attribute.

Figure 26:
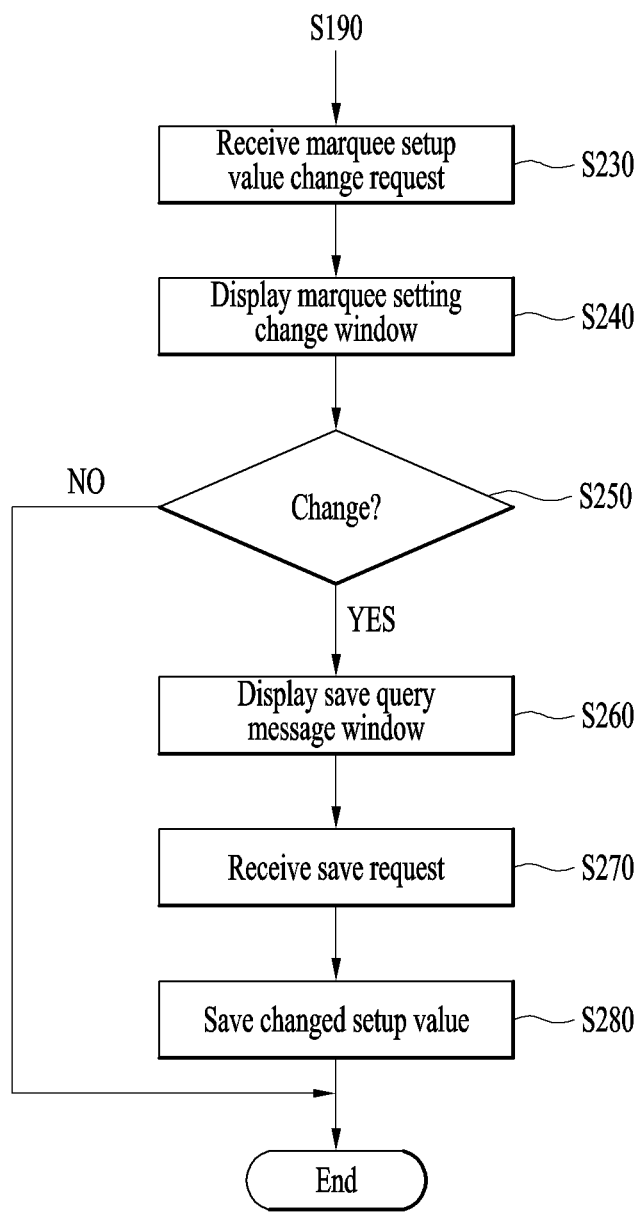

Meanwhile, referring to FIG. 26, when the digital device performs the marquee animation function of moving the text displayed within the text field in the preset direction, if a setup value change request signal is received [S230], the digital device displays a setup change window [S240] and checks whether a setup value is changed [S250]. If the setup value is changed, the digital device can create and display a user query message window for querying whether to save the changed setup value [S260].

If a changed setup value save request signal for saving the changed setup value is received from the user query message window [S270], the digital device can save the changed setup value [S280].

Accordingly, the present invention can support and process a marquee service in a web OS platform loaded digital device.

The present invention gives a marquee animation effect of moving a text displayed within a text filed according to a presence or non-presence of a marquee attribute of an activated field, thereby providing user's convenience.

The present invention gives a marquee animation effect to a text of high importance and urgency by switching an attribute type of a text field to a marquee attribute according to a presence or non-presence of a marquee attribute of a received text data, thereby providing user's interest and alarm service.

The present invention extracts a setup value for a marquee attribute of a text field and gives a marquee animation effect of moving a text displayed within the text field in a preset direction according to the extracted setup value, thereby providing a user with various visual effects.

And, the present invention can provide an editing service of changing a setup value for a marquee attribute in response to a request for changing the setup value for the marquee attribute.

MODE FOR INVENTION

A digital device and service processing method thereof disclosed in the present specification may be non-limited by the configurations and methods of the embodiments mentioned in the foregoing description. And, the embodiments mentioned in the foregoing description can be configured in a manner of being selectively combined with one another entirely or in part to enable various modifications.

A digital device operating method disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations such as transmission via Internet. Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to a digital device capable of performing a marquee function and service processing method thereof. Therefore, the present invention has industrial applicability.

What is claimed is:

1. A method of processing a service in a digital device, comprising:
   receiving text data;
   activating a text field desired to have the received text data displayed thereon;
   displaying the text data within the activated text field;
   checking whether an attribute type of the text field is a marquee attribute; and
   if the attribute type of the text field is the marquee attribute, moving a text displayed within the text field in a preset direction, wherein the checking whether the attribute type of the text field is the marquee attribute, comprising:
  if the attribute type of the text field is not the marquee attribute as a result of the checking, checking whether the text data includes the marquee attribute, and
  if the text data includes the marquee attribute as a result of the checking, switching the attribute type of the text field to the marquee attribute.

2. The method of claim 1, the checking whether the attribute type of the text field is the marquee attribute, comprising:
  checking whether the displayed text data exceeds a size of the text field; and
  if the displayed text data exceeds the size of the text field as a result of the checking whether the displayed text data exceeds the size of the text field, checking whether the attribute type of the text field is the marquee attribute.

3. The method of claim 1, the switching the attribute type of the text field to the marquee attribute, comprising:
  if the text data includes the marquee attribute as a result of the checking, creating and displaying a user query message window for querying whether to switch the text field to the marquee attribute; and
  if a marquee attribute switch request signal of the text field is received from the user query message window, switching the attribute type of the text field to the marquee attribute.

4. The method of claim 1, the switching the attribute type of the text field to the marquee attribute, comprising:
  if the text data includes the marquee attribute as a result of the checking, checking whether a priority of an attribute of the text data is higher than that of an attribute of the text field;
  if the priority of the attribute of the text data is higher than that of the attribute of the text field as a result of the checking, switching the attribute type of the text field to the marquee attribute.

5. The method of claim 4, the switching the attribute type of the text field to the marquee attribute, comprising:
  if the priority of the attribute of the text data is higher than that of the attribute of the text field as a result of the checking, creating and displaying a user query message window for querying whether to switch the text field to the marquee attribute; and
  if a marquee attribute switch request signal of the text field is received from the user query message window, switching the attribute type of the text field to the marquee attribute.

6. The method of claim 1, the moving the text displayed within the text field in the preset direction, comprising:
  if the attribute type of the text field is the marquee attribute as a result of the checking, extracting a setup value for the marquee attribute of the text field; and
  moving the text displayed within the text field in the preset direction according to the extracted setup value.

7. The method of claim 6, wherein the setup value comprises a text moving direction, a text moving speed, a text moving control signal, a text moving repeated count, and a text moving quantity.

8. The method of claim 7, wherein the text moving control signal comprises a cursor signal of a remote controller, a user's touch signal, a user's gesture signal and a user's pupil motion signal.

9. The method of claim 6, wherein the setup value varies in accordance with a country language of the text.

10. The method of claim 6, wherein the setup value varies in accordance with a type of the text field.

11. The method of claim 10, wherein if the type of the text field includes a multitude of subfields, the setup value of the subfield is equal to that of the text field.

12. The method of claim 10, wherein if the type of the text field includes a multitude of subfields, the setup value of the subfield is different from of the text field.

13. The method of claim 10, wherein if the type of the text field includes a multitude of subfields, setup values of the subfields are different from each other.

14. The method of claim 6, the moving the text displayed within the text field in the preset direction, comprising:
  if a change request signal of the setup value is received, displaying a setting change window;
  if the setup value is changed through the setting change window, creating and displaying a user query message window for querying whether to save the changed setup value; and
  if a save request signal of the changed setup value is received from the user query message window, saving the changed setup value.

15. A digital device, comprising:
  a communication module receiving text data;
  a display module displaying the received text data within a text field; and
  a controller configured to control an operation of the digital device,
  wherein the controller is further configured to activate the text field desired to have the received text data displayed thereon, check whether an attribute type of the text field is a marquee attribute, and if the attribute type of the text field is the marquee attribute as a result of the checking, move a text displayed within the text field in a preset direction,
  wherein the controller is configured to:
    if the attribute type of the text field is not the marquee attribute as a result of the checking, check whether the text data includes the marquee attribute, and
    if the text data includes the marquee attribute as a result of the checking, switch the attribute type of the text field to the marquee attribute.

16. The digital device of claim 15, wherein if the attribute type of the text field is not the marquee attribute and the text data includes the marquee attribute, the controller checks whether a priority of an attribute of the text data is higher than that of an attribute of the text field, and wherein if the priority of the attribute of the text data is higher than that of the attribute of the text field, the controller switches the attribute type of the text field to the marquee attribute.

17. The digital device of claim 15, wherein if the attribute type of the text field is the marquee attribute, the controller extracts a setup value for the marquee attribute of the text field and moves the text displayed within the text field in the preset direction according to the extracted setup value.

18. The digital device of claim 17, wherein if a change request signal of the setup value is received, the controller creates and displays a setting change window, wherein if the setup value is changed through the setting change window, the controller creates and displays a user query message window for querying whether to save the changed setup value, and wherein if a save request signal of the changed setup value is received from the user query message window, the controller saves the changed setup value.

* * * * *